US008498023B2

(12) United States Patent
Suzuki

(10) Patent No.: US 8,498,023 B2
(45) Date of Patent: Jul. 30, 2013

(54) IMAGE SCANNING DEVICE AND COMPUTER-READABLE RECORD MEDIUM STORING PROGRAM FOR STORAGE AREA ALLOCATION IN THE SAME

(75) Inventor: Nobuhiko Suzuki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1035 days.

(21) Appl. No.: 12/496,098

(22) Filed: Jul. 1, 2009

(65) Prior Publication Data

US 2010/0002270 A1 Jan. 7, 2010

(30) Foreign Application Priority Data

Jul. 3, 2008 (JP) ................................. 2008-174935

(51) Int. Cl.
*H04N 1/00* (2006.01)
(52) U.S. Cl.
USPC .......... 358/404; 358/1.16; 358/505; 358/524; 710/53; 710/56; 710/57; 711/171
(58) Field of Classification Search
USPC ........ 358/1.15, 1.16, 505, 524, 404; 711/171; 710/56, 57, 53
See application file for complete search history.

(56) References Cited

U.S. PATENT DOCUMENTS

| | | | | |
|---|---|---|---|---|
| 5,046,039 A | * | 9/1991 | Ugajin et al. .................... | 710/56 |
| 5,801,837 A | * | 9/1998 | Hamanaka et al. ........... | 358/296 |
| 6,111,591 A | | 8/2000 | Ohtake et al. | |
| 2004/0233924 A1 | * | 11/2004 | Bilak et al. ..................... | 370/412 |
| 2006/0031644 A1 | * | 2/2006 | Hughes ......................... | 711/159 |

FOREIGN PATENT DOCUMENTS

| | | |
|---|---|---|
| JP | HEI 4-142867 | 5/1992 |
| JP | 5-301390 | 11/1993 |
| JP | HEI 7-273957 | 10/1995 |
| JP | HEI 9-222986 | 8/1997 |
| JP | 2002-11906 | 1/2002 |
| JP | 2003-8797 | 1/2003 |
| JP | 2005-110020 | 4/2005 |

OTHER PUBLICATIONS

Japanese Official Action dated Jun. 29, 2010 together with an English language translation.

* cited by examiner

*Primary Examiner* — King Poon
*Assistant Examiner* — Jamares Q Washington
(74) *Attorney, Agent, or Firm* — Scully, Scott, Murphy & Presser, PC

(57) ABSTRACT

An image scanning device includes a scanning unit configured to execute image scanning of a document and thereby generate image data, at least one processing unit configured to successively process the image data outputted from the scanning unit, a transmission unit configured to transmit the image data outputted from the processing unit, a storage unit, in which multiple buffer areas to be used for transferring the image data among the scanning unit, the at least one processing unit and the transmission unit are allocated, an acquisition unit configured to acquire information on usage status of each of the buffer areas, and a changing unit configured to change storage area allocation at least between two of the buffer areas based on the usage status acquired by the acquisition unit.

19 Claims, 20 Drawing Sheets

IMAGE SCANNING DEVICE AND COMPUTER-READABLE RECORD MEDIUM STORING PROGRAM FOR STORAGE AREA ALLOCATION IN THE SAME

CROSS-REFERENCE TO RELATED APPLICATION

This application claims priority under 35 U.S.C. §119 from Japanese Patent Application No. 2008-174935 filed on Jul. 3, 2008. The entire subject matter of the application is incorporated herein by reference.

BACKGROUND

1. Technical Field

The present invention relates to an image scanning device and a computer-readable record medium storing a program for storage area allocation in the image scanning device.

2. Related Art

There exists a known printing device which is equipped with a buffering mechanism (receiving print data from a higher-level processing unit, buffering the print data in a storage unit and thereafter transferring the buffered print data to a lower-level processing unit) and which lets the user set the storage unit's upper limit capacity available for the buffering (see Japanese Patent Provisional Publication No. 2002-11906, for example).

However, in the case of an image scanning device in which image data is stored in multiple buffer areas reserved in a memory (e.g. RAM) for multiple units (processing unit, interface, etc.), respectively, it is not easy for the user to allocate appropriate storage areas (capacities) to the multiple buffer areas.

SUMMARY

The present invention, which has been made in consideration of the above problem, is advantageous in that an image scanning device and a computer-readable record medium storing a program facilitating the storage area allocation to multiple buffer areas can be provided.

According to aspects of the present invention, there is provided an image scanning device having a scanning unit configured to execute image scanning of a document and thereby generate image data, at least one processing unit configured to successively process the image data outputted from the scanning unit, a transmission unit configured to transmit the image data outputted from the processing unit, a storage unit, in which multiple buffer areas to be used for transferring the image data among the scanning unit, the at least one processing unit and the transmission unit are allocated, an acquisition unit configured to acquire information on usage status of each of the buffer areas, and a changing unit configured to change storage area allocation at least between two of the buffer areas based on the usage status acquired by the acquisition unit.

In the image scanning device configured as above, the changing unit changes the storage area allocation at least between two of the buffer areas based on the usage status of each buffer area, by which the performance of the image scanning device can be improved without the need of user operations for changing the storage area allocation. Consequently, the allocation of storage areas to multiple buffers is facilitated remarkably.

According to aspects of the present invention, there is provided a computer-readable record medium storing a program including computer-readable instructions that cause a computer to execute an allocation process of allocating storage areas to multiple buffer areas of an image scanning device which is equipped with a scanning unit executing image scanning of a document and thereby generating image data, at least one processing unit successively processing the image data outputted from the scanning unit, a transmission unit transmitting the image data outputted from the processing unit and a storage unit in which the multiple buffer areas to be used for transferring the image data among the scanning unit, the at least one processing unit and the transmission unit are allocated. The allocation process includes an acquisition step of acquiring information on usage status of each of the buffer areas and a changing step of changing the storage area allocation at least between two of the buffer areas based on the acquired usage status.

By making a computer operate according to the computer-readable instructions acquired (loaded, installed, etc.) from the computer-readable record medium, effects similar to those of the image scanning device described above can be achieved.

Other objects, features and advantages of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENTS

Figure 1:
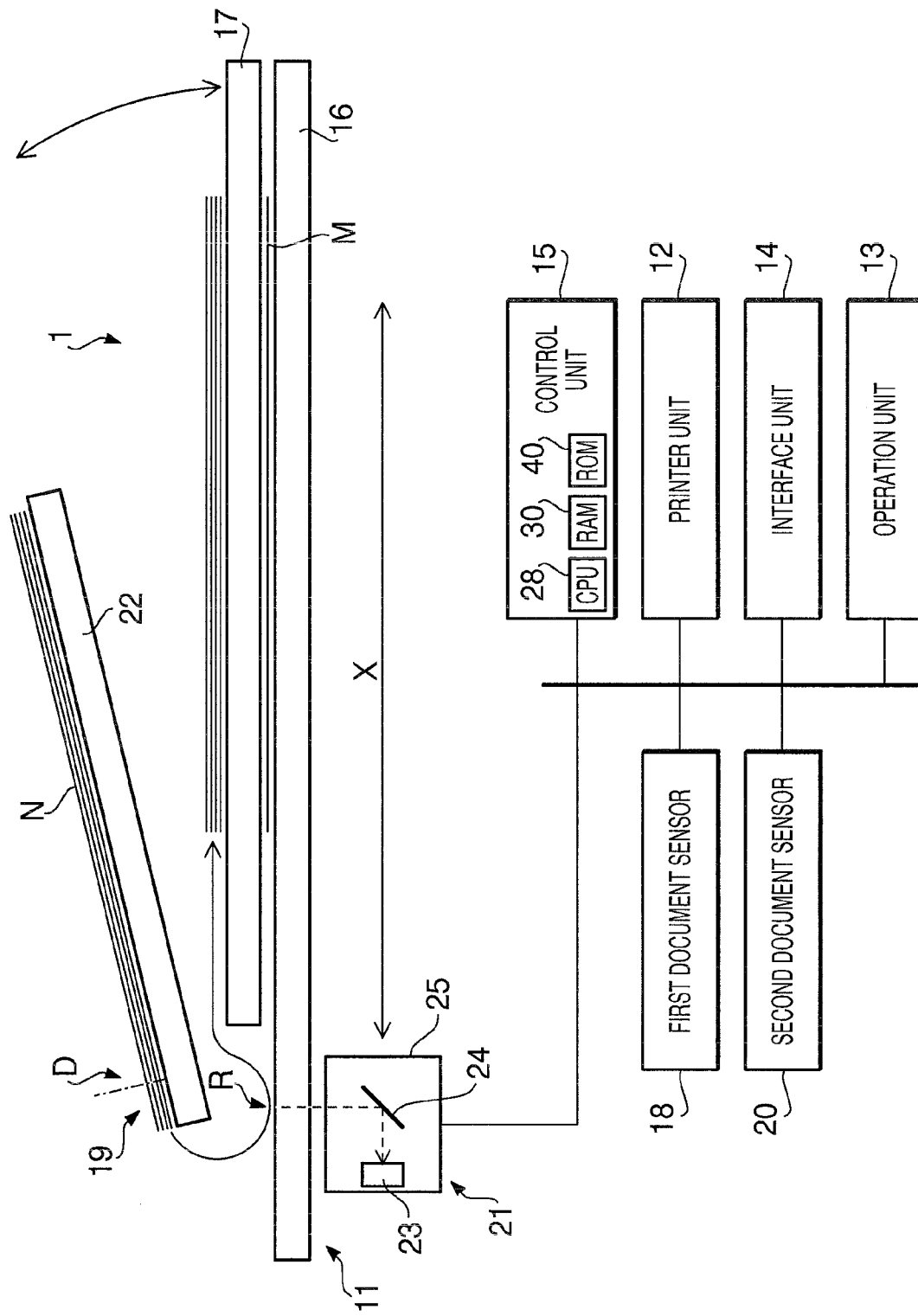
FIG. 1 is a schematic diagram showing an MFP (Multi-Function Peripheral) as an example of an image scanning device in accordance with an embodiment of the present invention.

Referring now to the drawings, a description will be given in detail of preferred embodiments in accordance with the present invention.

<Embodiment 1>

In the following, a first embodiment in accordance with the present invention will be described referring to FIGS. 1-11.

(1-1) Configuration of MFP

FIG. 1 is a schematic diagram showing an MFP (Multi-Function Peripheral) 1 having the scanner function, printer function, copy function, facsimile function, etc. as an example of an image scanning device in accordance with an embodiment of the present invention. The MFP 1 includes a scanner unit 11, a printer unit 12, an operation unit 13, an interface unit 14 and a control unit 15.

The scanner unit 11 (so-called flat bed image scanner) includes a first document table 16 (transparent plate-like part on which a document to be scanned is placed), a document cover 17, an ADF (Automatic Document Feeder) 19 which feeds a document placed on a second document table 22 to a scanning position R, a first document sensor 18 which detects the document (M) placed on the first document table 16, a second document sensor 20 which detects the document (N) placed on the second document table 22, and a scanning unit 21 which scans the document M (on the first document table 16) or N (fed to the scanning position R by the ADF 19) and thereby generates image data.

The ADF 19 includes the second document table 22 on which the document N (a sheet or a stack of sheets) to be scanned is placed, multiple rollers (unshown), and a drive motor (unshown) for driving and rotating the rollers. The ADF 19 separates a document N (sheet) from the stack on the second document table 22 one by one and feeds the separated document N to the scanning position R. The document N being fed through the scanning position R is scanned by the scanning unit 21 and thereafter ejected onto the document cover 17.

The first document sensor 18 is implemented by, for example, a photoelectric sensor placed under the first document table 16. Light reflected by the document M or the document cover 17 is incident on the photoelectric sensor. Whether a document M exists on the first document table 16 or not is judged by the control unit 15 based on the output of the photoelectric sensor.

The second document sensor 20 is implemented by, for example, a switch which turns ON when the document N is placed on the second document table 22 to reach a detecting position D and which remains OFF when no document N exists at the detecting position D. Whether a document N exists on the second document table 22 or not is judged by the control unit 15 based on the output of the second document sensor 20.

Figure 2:
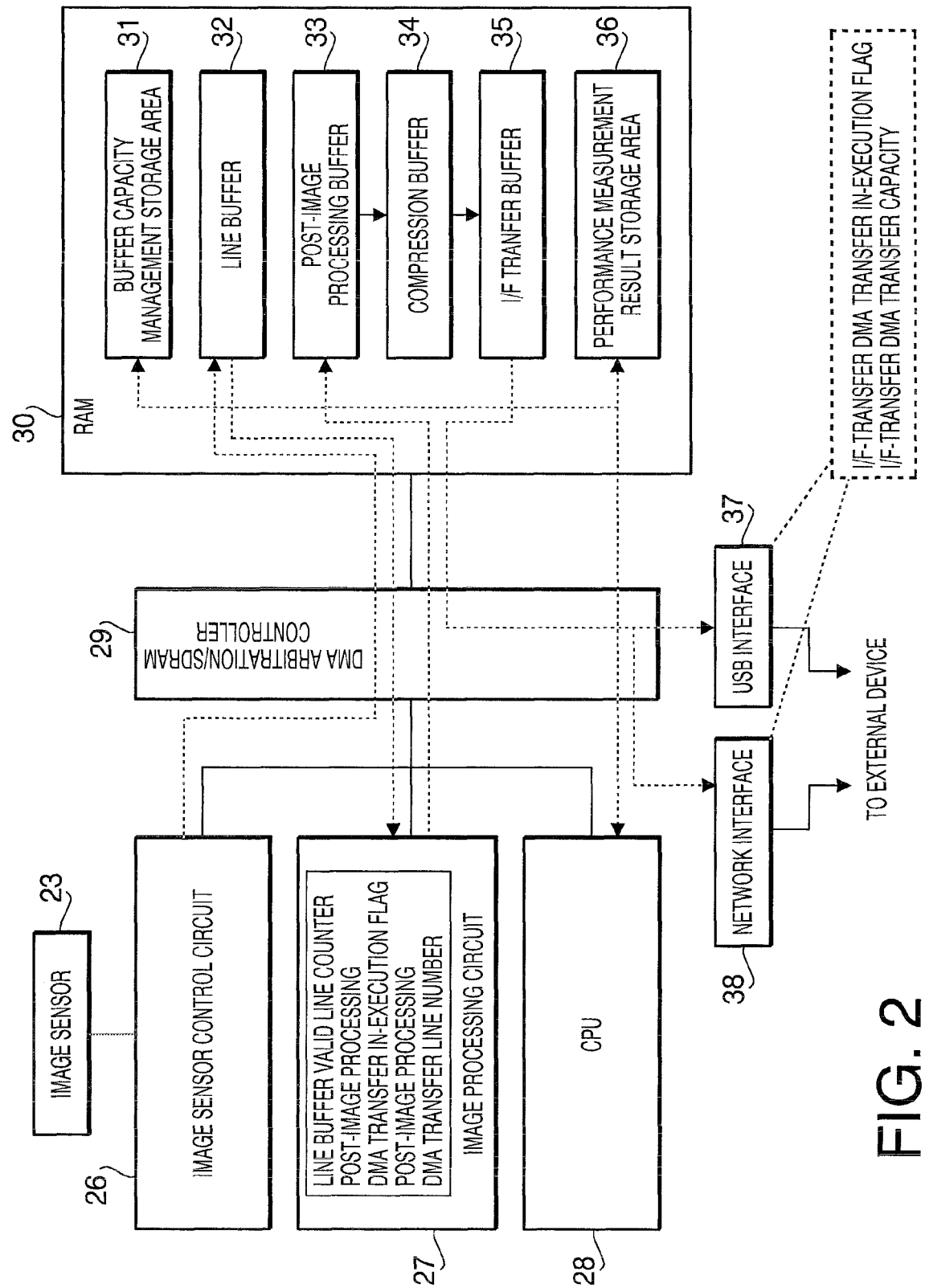
FIG. 2 is a block diagram showing the flow of image data in the MFP from the image scanning of a document to the transmission of image data (obtained by the document scanning) to an external device.

The scanning unit 21 includes an image sensor 23 such as a CIS (Contact Image Sensor) or CCD (Charge-Coupled Device), a light source (unshown) for illuminating the document, an optical system 24 for letting reflected light from the document be incident on the image sensor 23, a carriage 25 on which the image sensor 23, the light source, etc. are mounted, an image sensor control circuit 26 shown in FIG. 2, an image processing circuit 27 shown in FIG. 2, etc.

The printer unit 12, having a feeding mechanism for feeding a print medium such as paper, prints an image on the print medium by an appropriate printing method (laser printing, inkjet printing, etc.) according to image data generated by the scanner unit 11, image data received by the interface unit 14 (explained later), etc.

The operation unit 13 includes operation buttons (for letting the user make various settings and give various operational instructions) and a display device (e.g. liquid crystal display).

The interface unit 14 includes a USB interface 37 for implementing connection with a PC (Personal Computer) via a USB cable and a network interface 38 for implementing communication with external devices (PC, network server, etc.) via a telecommunication circuit (e.g. LAN) as shown in FIG. 2. The interface unit 14 further includes an interface (e.g. modem) for transmitting and receiving image data by facsimile communication via a public telephone circuit. Although not shown in the figures, the interface unit 14 may further include a parallel interface for implementing connection with a PC via a parallel cable, an interface to which an external storage device (USB memory, memory card, etc.) can be connected, etc.

The control unit 15 includes a CPU (Central Processing Unit) 28, a ROM (Read Only Memory) 40 and a RAM (Random Access Memory) 30 shown in FIGS. 1 and 2. The control unit 15 controls the components of the MFP 1 by executing various programs stored in the ROM 40.

(1-2) Outline of Data Transfer

FIG. 2 is a block diagram showing the flow of image data in the MFP 1 from the image scanning of a document to the transmission of image data (obtained by the document scanning) to an external device. As shown in FIG. 2, four buffer areas (line buffer 32, post-image processing buffer 33, compression buffer 34, I/F transfer buffer 35) are allocated (reserved) in the RAM 30 in this embodiment. Between the document scanning and the transmission to the external device, the transfer of image data among the image sensor control circuit 26, the image processing circuit 27, the CPU 28 and the interface unit 14 is carried out via the four buffer areas (hereinafter simply referred to as "buffers"). In this embodiment, each of the buffers is used as a ring buffer.

A buffer capacity management storage area 31 (storing various variables and flags used for managing the full capacity and free space of each buffer and checking whether a buffer-full state (i.e. a buffer being substantially full of data) has occurred or not in each buffer) and a performance measurement result storage area 36 (storing data representing the usage status of each buffer) are also allocated (reserved) in the RAM 30 as shown in FIG. 2.

(1-2-1) DMA Transfer from Image Sensor Control Circuit to Line Buffer

After executing the scanning of the document for one line, the image sensor 23 outputs an image signal representing the scanned line to an analog-to-digital converter circuit (unshown). The image signal (analog) is converted by the analog-to-digital converter circuit into digital data and outputted to the image sensor control circuit 26 as image data for one line.

The image sensor control circuit 26 executes prescribed processes (shading correction, γ correction, etc.) to the one-line image data. The one-line image data processed by the image sensor control circuit 26 is transferred to the line buffer 32 by means of DMA (Direct Memory Access) by a DMA arbitration/SDRAM controller 29 (hereinafter simply referred to as a "DMA controller 29").

The DMA transfer (from the image sensor control circuit 26 to the line buffer 32) is executed under the control of the image sensor control circuit 26. After executing the prescribed processes to the one-line image data, the image sensor control circuit 26 immediately instructs the DMA controller 29 to DMA transfer the processed image data to the line buffer 32. In other words, the image sensor control circuit 26 issues the instruction for the DMA transfer without checking the free space of the line buffer 32. In this case, if the line buffer 32 is in the buffer-full state, image data already stored in the line buffer 32 (line buffer data) is overwritten with the image data transferred from the image sensor control circuit 26. In order to prevent the overwriting, the CPU 28 in this embodiment monitors the free space of the line buffer 32 and instructs the image sensor control circuit 26 to interrupt the document scanning when the line buffer 32 does not have a sufficient free space. By the interruption of the document scanning, the output of the image signal from the image sensor 23 is stopped and the overwriting of the line buffer data is prevented.

The number of lines of valid line buffer data stored in the line buffer 32 is counted by the image processing circuit 27. As shown in FIG. 2, the image processing circuit 27 is equipped with a "line buffer valid line counter". The image processing circuit 27 increments the "line buffer valid line counter" by 1 when a piece of one-line image data has been DMA transferred from the image sensor control circuit 26 to the line buffer 32.

(1-2-2) DMA Transfer from Line Buffer to Image Processing Circuit

The line buffer data stored in the line buffer 32 is DMA transferred to the image processing circuit 27.

The DMA transfer (from the line buffer 32 to the image processing circuit 27) is executed under the control of the image processing circuit 27. When the "line buffer valid line counter" has reached a prescribed value (i.e. when the number of lines of the line buffer data stored in the line buffer 32 has reached a prescribed number of lines), the image processing circuit 27 instructs the DMA controller 29 to DMA transfer the prescribed number of lines of line buffer data from the line buffer 32 to the image processing circuit 27. After the DMA transfer is finished, the image processing circuit 27 decrements the "line buffer valid line counter" by the number of lines of the DMA transfer.

(1-2-3) DMA Transfer from image Processing Circuit to Post-image Processing Buffer To the image data which has been DMA transferred from the line buffer 32, a variety of image processing (color space conversion, sharpening, etc.) is executed by the image processing circuit 27. The image data after undergoing the image processing by the image processing circuit 27 (post-image processing data) is DMA transferred to the post-image processing buffer 33.

The DMA transfer (from the image processing circuit 27 to the post-image processing buffer 33) is executed under the control of the CPU 28 differently from the aforementioned "DMA transfer from the image sensor control circuit 26 to the line buffer 32" and "DMA transfer from the line buffer 32 to the image processing circuit 27". Specifically, the CPU 28 first sets a "post-image processing DMA transfer line number" (the number of lines of post-image processing data to be DMA transferred from the image processing circuit 27 to the post-image processing buffer 33) based on the free space of the post-image processing buffer 33. Subsequently, the CPU 28 instructs the DMA controller 29 to execute the DMA transfer from the image processing circuit 27 to the post-image processing buffer 33 (post-image processing DMA transfer). In the following explanation, the instruction to the DMA controller 29 for the post-image processing DMA transfer will also be referred to as "activation" of the post-image processing DMA transfer.

As shown in FIG. 2, the image processing circuit 27 is equipped with a "post-image processing DMA transfer in-execution flag" indicating whether the post-image processing DMA transfer is in execution or not. The CPU 28 sets the "post-image processing DMA transfer in-execution flag" to ON upon the "activation" of the post-image processing DMA transfer.

After the activation of the post-image processing DMA transfer, post-image processing data that are transferable from the image processing circuit 27 are successively transferred to the post-image processing buffer 33. At the point when the number of lines of already transferred post-image processing data has reached the "post-image processing DMA transfer line number", the DMA transfer from the image processing circuit 27 is ended and the "post-image processing DMA transfer in-execution flag" is set to OFF.

(1-2-4) Transfer from Post-image Processing Buffer to Compression Buffer

The post-image processing data stored in the post-image processing buffer 33 is read out by the CPU 28, undergoes a prescribed compression process (e.g. JPEG compression), and is written into the compression buffer 34. Thus, the data loading (reading) from the post-image processing buffer 33 to the CPU 28 and the data loading (writing) from the CPU 28 to the compression buffer 34 are carried out not by the DMA controller 29 but by the CPU 28.

(1-2-5) Transfer from Compression Buffer to I/F Transfer Buffer

The compressed post-image processing data (compressed data) stored in the compression buffer 34 is read out by the CPU 28, converted into I/F transfer data (in a format that is suitable for the interface) and written into the I/F transfer buffer 35. Thus, the data loading (reading) from the compression buffer 34 to the CPU 28 and the data loading (writing) from the CPU 28 to the I/F transfer buffer 35 are carried out not by the DMA controller 29 but by the CPU 28.

(1-2-6) DMA Transfer from I/F Transfer Buffer to Interface

The I/F transfer data stored in the I/F transfer buffer 35 is DMA transferred to an interface such as the USB interface 37 or the network interface 38 (hereinafter simply referred to as "the interface").

The DMA transfer (from the I/F transfer buffer 35 to the interface) is executed under the control of the CPU 28. Specifically, the CPU 28 sets an "I/F-transfer DMA transfer capacity" at the amount of the I/F transfer data which has been written into the I/F transfer buffer 35 and then instructs the DMA controller 29 to carry out the DMA transfer from the I/F transfer buffer 35 to the interface (I/F-transfer DMA transfer). In the following explanation, the instruction to the DMA controller 29 for the I/F-transfer DMA transfer will also be referred to as "activation" of the I/F-transfer DMA transfer.

As shown in FIG. 2, the interface is equipped with an "I/F-transfer DMA transfer in-execution flag" indicating whether the I/F-transfer DMA transfer is in execution or not. The CPU 28 sets the "I/F-transfer DMA transfer in-execution flag" to ON upon the "activation" of the I/F-transfer DMA transfer.

After the activation of the I/F-transfer DMA transfer, the I/F transfer data is DMA transferred from the i/F transfer buffer 35 to the interface by the DMA controller 29. The interface sets the "i/F-transfer DMA transfer in-execution flag" to OFF when the DMA transfer is finished.

(1-3) Document Scanning and Changing of Storage Area Allocation to Each Buffer

Figure 3:
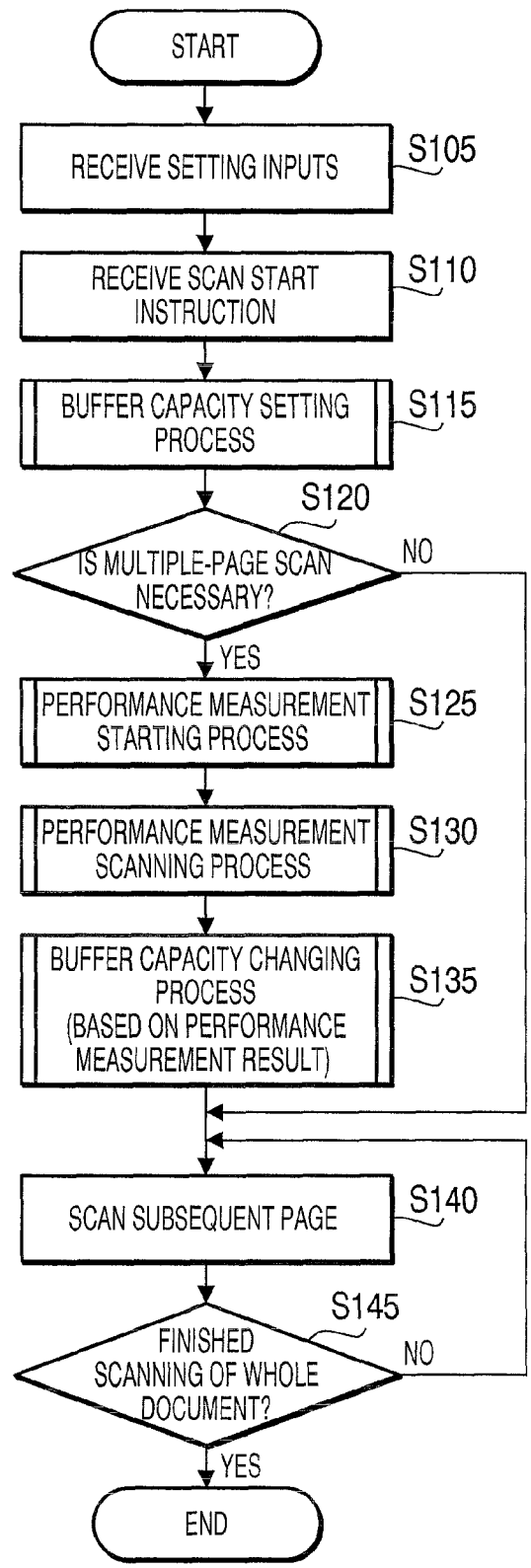
FIG. 3 is a flow chart showing a process executed by the CPU of the MFP for scanning a document and changing storage area allocation to each buffer.

FIG. 3 is a flow chart showing a process executed by the CPU 28 of the MFP 1 for scanning a document and changing the storage area allocation to each buffer. In this embodiment, (information on) the usage status of each buffer is acquired and the storage area allocation to each buffer is changed only when the document to be scanned includes two or more pages (multiple-page document). When the document to be scanned includes only one page (single-page document), the acquisition of the usage status of each buffer is left out and thus the changing of the storage area allocation is also left out.

In the scanning of a multiple-page document, the CPU 28 acquires the usage status of each buffer from the image scanning of the first page (example of a "prescribed area") to the transmission of the image data of the first page to the external device (e.g. from the beginning of the image scanning of the first page to the end of the transmission of the first-page image data), changes the storage area allocation at least between two buffers based on the acquired usage status, and starts the scanning of subsequent pages after the changing of the allocation. Incidentally, the above period during which the CPU 28 acquires the usage status of each buffer may be adjusted properly.

In the first embodiment (describing an example of a method of changing the storage area allocation based on acquired usage status), the storage area allocation to a buffer entering the buffer-full state last (or one of buffers not entering the buffer-full state, if any) is decreased while increasing the storage area allocation to a buffer entering the buffer-full state first.

Incidentally, the aforementioned "DMA transfer from the image sensor control circuit 26 to the line buffer 32" and "DMA transfer from the line buffer 32 to the image processing circuit 27" do not appear in the flow chart of FIG. 3 since they are executed without the engagement of the CPU 28. In step S105, the CPU 28 receives a variety of setting information (regarding the document scanning) inputted from the PC (external device). In this embodiment, the setting information is inputted via the USB interface 37 or the network interface 38 (interface). The CPU 28 transmits the image data generated by the document scanning to the PC via the interface.

In the next step S110, the CPU 28 receives a scan start instruction inputted from the PC.

In the next step S115, the CPU 28 executes a "buffer capacity setting process". The buffer capacity setting process is executed for setting an initial capacity of each buffer. The details of the process will be explained later.

In the next step S120, the CPU 28 judges whether the scanning of multiple pages (multiple-page scan) is necessary or not. For example, the CPU 28 judges that the multiple-page scan is necessary when the document (N) is on the second document table 22, while judging that a single-page scan should be executed when the document (M) is on the first document table 16. If the multiple-page scan is necessary (S120: YES), the CPU 28 advances to step S125, otherwise (S120: NO) the CPU 28 advances to step S140.

The CPU 28 may also let the user specify whether the document to be scanned includes multiple pages or not through the operation unit 13 since there are cases where the user conducts the multiple-page scan by successively placing consecutive pages on the first document table 16 one by one.

In the step S125, the CPU 28 executes a "performance measurement starting process". The performance measurement starting process is executed for preparing for the acquisition of the usage status of each buffer. The details of the process will be explained later.

In the next step S130, the CPU 28 executes a "performance measurement scanning process". The performance measurement scanning process is executed for scanning the first page while also acquiring (information on) the usage status of each buffer from the image scanning of the first page to the transmission of the image data of the first page. The details of the process will be explained later.

In the next step S135, the CPU 28 executes a "buffer capacity changing process (based on performance measurement result)". The buffer capacity changing process (based on performance measurement result) is executed for changing the storage area allocation at least between two buffers based on the usage status of each buffer acquired in the performance measurement scanning process. The details of the process will be explained later.

In the step S140, the CPU 28 executes the scanning of the subsequent page (in the case of the multiple-page scan) or the scanning of the first page again (in the case of the single-page scan).

In the step S145, the CPU 28 judges whether or not the scanning of the whole document (the single page in the single-page scan or all the pages in the multiple-page scan) has been finished. If negative (S145: NO), the CPU 28 returns to the step S140 and executes the scanning of the subsequent page, otherwise (S145: YES) the CPU 28 ends the process of FIG. 3.

(1-3-1) Buffer Capacity Setting Process

Figure 4:
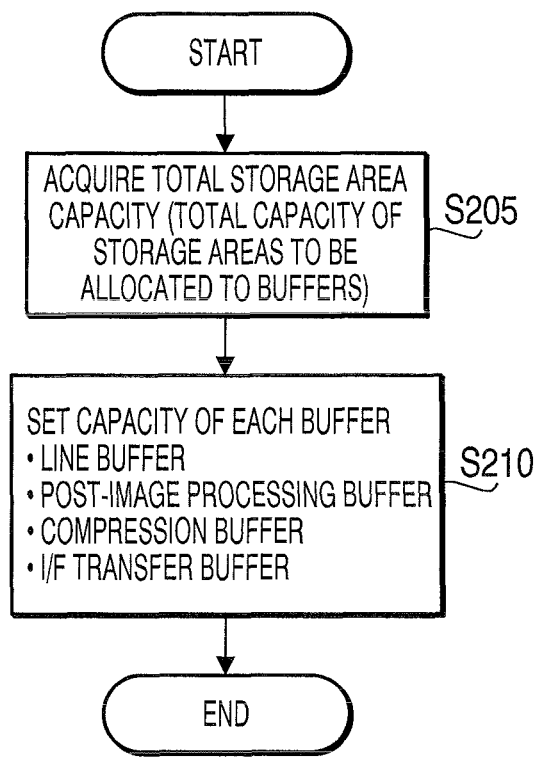
FIG. 4 is a flow chart showing a buffer capacity setting process which is included in the process of FIG. 3.

FIG. 4 is a flow chart showing the buffer capacity setting process.

In step S205, the CPU 28 acquires a "total storage area capacity" which represents the total capacity of the storage areas to be allocated to the buffers. The total storage area capacity (total capacity) has previously been stored as a fixed value in the ROM 40, for example. The CPU 28 acquires the total capacity by reading it from the ROM 40.

Figure 5:
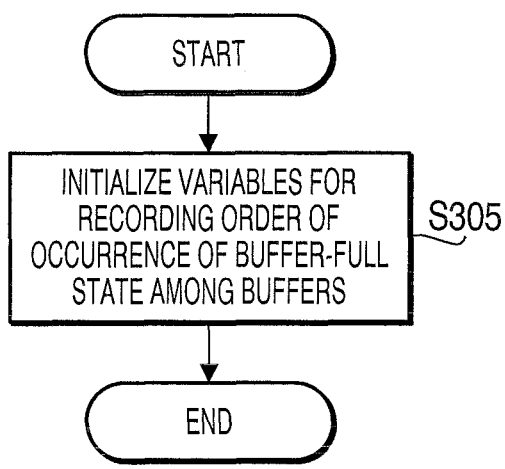
FIG. 5 is a flow chart showing a performance measurement starting process which is included in the process of FIG. 3.
Figure 6:
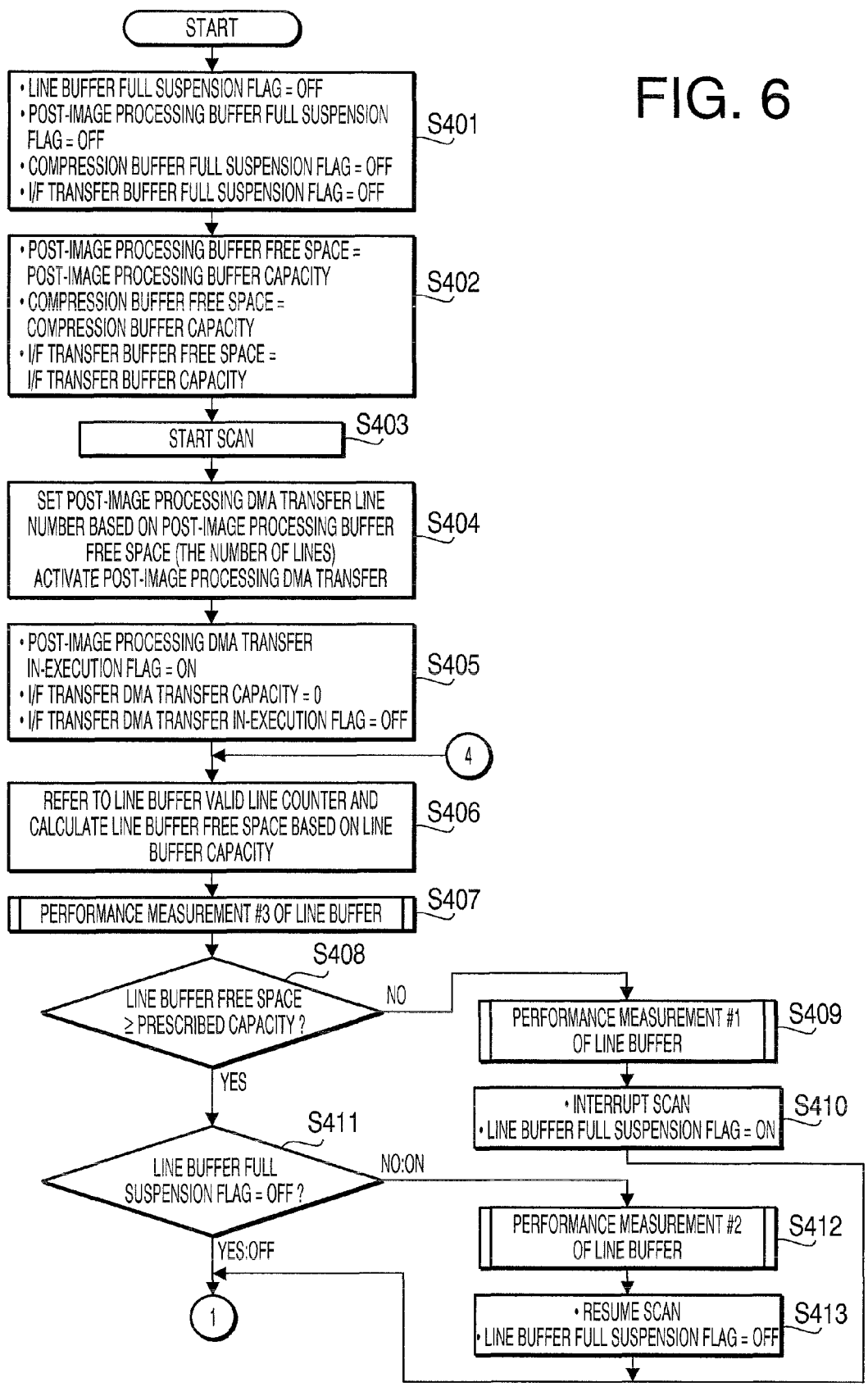
FIGS. 6-9 are flow charts showing a performance measurement scanning process which is included in the process of FIG. 3.
Figure 7:
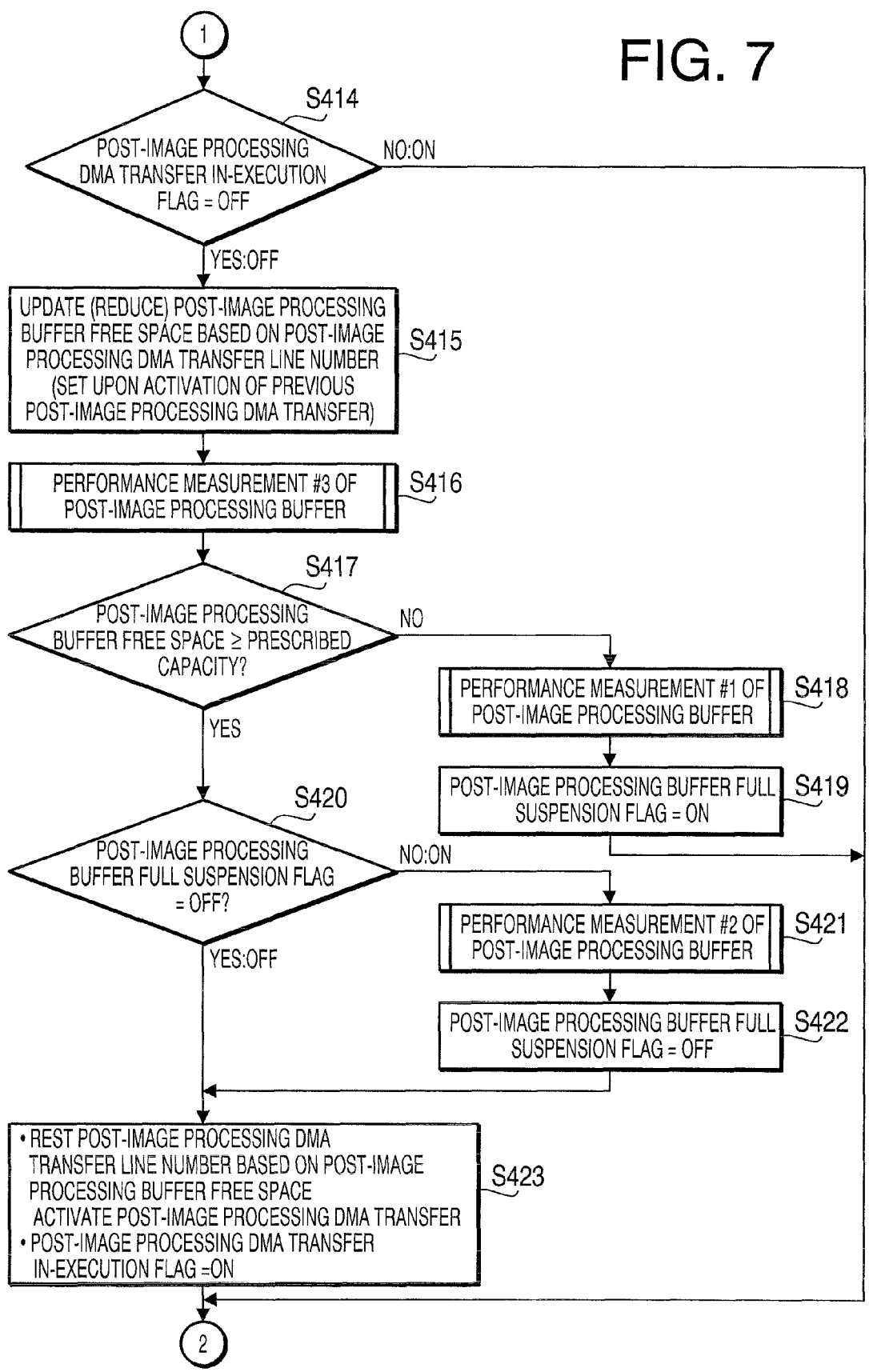
Figure 8:
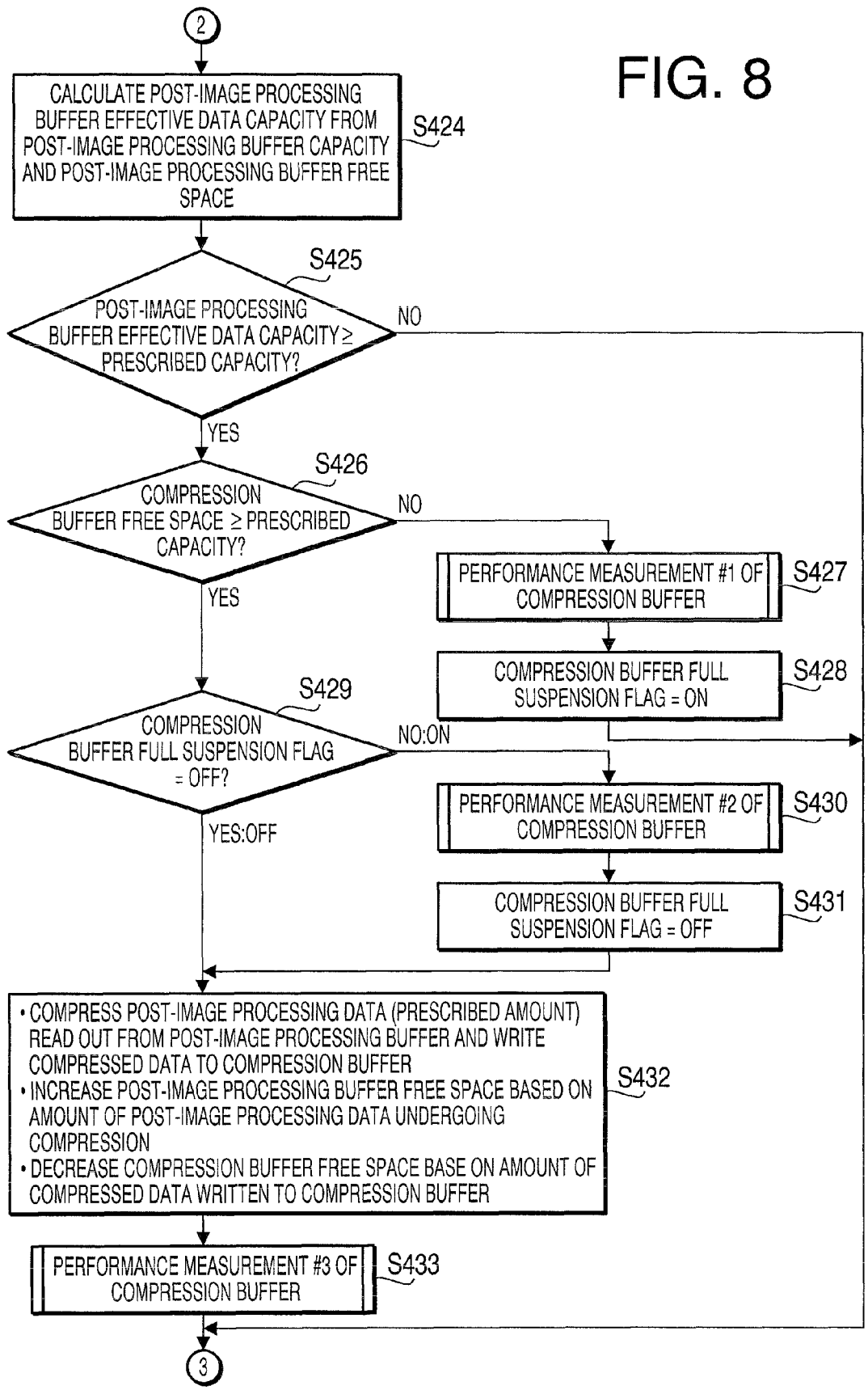
Figure 9:
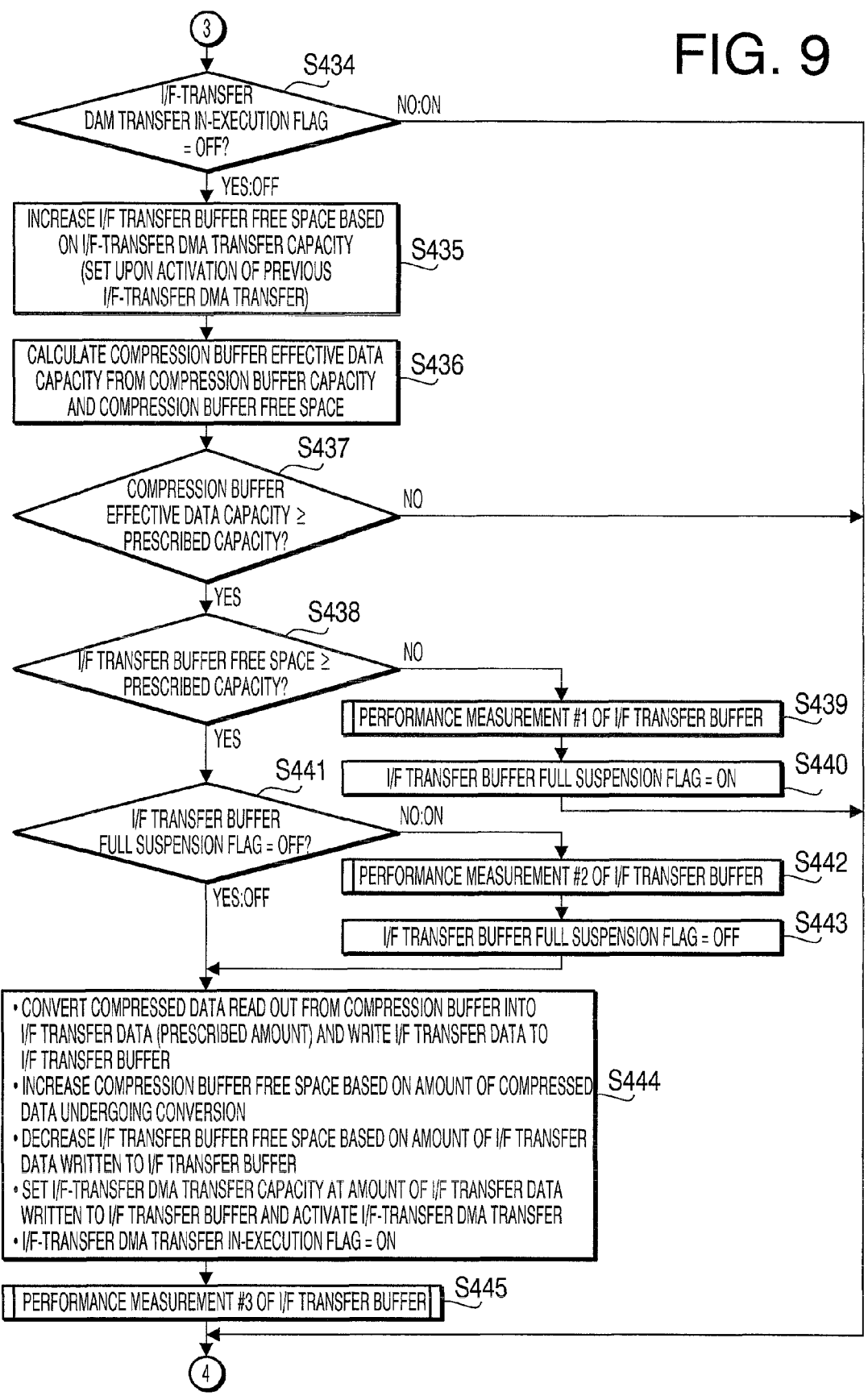

In the next step S210, the CPU 28 sets the capacity of each buffer. For example, when a ratio of storage area allocation among the line buffer 32, the post-image processing buffer 33, the compression buffer 34 and the I/F transfer buffer 35 has been set at 3:5:1:1 and the total capacity acquired in S205 is 10 MB (megabytes), the capacity of each buffer (32, 33, 34, 35) is set as follows:

line buffer capacity=3 MB
    post-image processing buffer capacity=5 MB
    compression buffer capacity=1 MB
    I/F transfer buffer capacity=1 MB (1-3-2) Performance Measurement Starting Process FIG. 5 is a flow chart showing the performance measurement starting process.

In step S305, the CPU 28 initializes variables ("first buffer type", "second buffer type", "third buffer type", "fourth buffer type") which are used for recording the order of occurrence of the buffer-full state among the buffers 32, 33, 34 and 35. Each buffer (32, 33, 34, 35) has previously been assigned a unique buffer type number. By the initialization, the variables (first through fourth buffer type) are set at a particular value (e.g. 0) that is different from the buffer type numbers assigned to the buffers.

(1-3-3) Performance Measurement Scanning Process

FIGS. 6-9 are flow charts showing the performance measurement scanning process. The flow charts of FIGS. 6-9 will be used below in common for the explanation of the first through fifth embodiments. The "PERFORMANCE MEASUREMENT #2 OF XXX BUFFER" and "PERFORMANCE MEASUREMENT #3 OF XXX BUFFER" in the flow charts ("XXX BUFFER" represents a buffer name) are not executed in some of the embodiments. Whether the performance measurement #2 or #3 is executed or not will be explained in each of the embodiments.

In step S401, the CPU 28 initializes variables ("line buffer full suspension flag", "post-image processing buffer full suspension flag", "compression buffer full suspension flag", "I/F transfer buffer full suspension flag") which represent whether each buffer is in the buffer-full state or not. By the initialization, each of the flags is set to OFF (indicating that the corresponding buffer is not in the buffer-full state).

In the next step S402, the CPU 28 sets variables representing the free spaces of the post-image processing buffer 33, the compression buffer 34 and the I/F transfer buffer 35 ("post-image processing buffer free space", "compression buffer free space", "I/F transfer buffer free space") at the capacities which have been set in the step S210.

In the next step S403, the CPU 28 instructs the image sensor control circuit 26 to start the scan, by which the document scanning by the image sensor 23 is started.

In the next step S404, the CPU 28 sets the "post-image processing DMA transfer line number" based on the "post-image processing buffer free space". Specifically, the CPU 28 calculates the number of lines transferable to the post-image processing buffer 33 by dividing the "post-image processing buffer free space" by the amount of the post-image processing data per line and then sets the "post-image processing DMA transfer line number" at the obtained number of lines. Thereafter, the CPU 28 activates the post-image processing DMA transfer.

In the next step S405, the CPU 28 first sets the "post-image processing DMA transfer in-execution flag" (indicating whether the post-image processing DMA transfer is in execution or not) to ON (meaning "in execution") and then sets the "I/F-transfer DMA transfer capacity" at 0 (initial value). The reason why the "I/F-transfer DMA transfer capacity" is set at 0 will be explained later in step S435.

Subsequently, the CPU 28 sets the "I/F-transfer DMA transfer in-execution flag" (indicating whether the I/F-transfer DMA transfer is in execution or not) to OFF (meaning "not in execution"). The reason why the "I/F-transfer DMA transfer in-execution flag" is set to OFF will be explained later in step S434.

In the next step S406, the CPU 28 reads out the number of lines of the line buffer data from the "line buffer valid line counter" and calculates the "line buffer free space" by subtracting a data amount corresponding to the obtained number of lines from the line buffer capacity.

The next step S407 (performance measurement #3 of the line buffer 32) is not executed in the first embodiment.

In the next step S408, the CPU 28 judges whether or not the "line buffer free space" is a prescribed capacity or more. The "prescribed capacity" is a value as a criterion for the judgment on the buffer-full state. If the "line buffer free space" is the prescribed capacity or more (S408: YES), the CPU 28 (judging that the buffer-full state has not occurred in the line buffer 32) advances to step S411, otherwise (S408: NO) the CPU 28 (judging that the buffer-full state has occurred in the line buffer 32) advances to step S409.

In the step S409, the CPU 28 executes performance measurement #1 of the line buffer 32 (details will be explained later).

In the next step S410, the CPU 28 instructs the image sensor control circuit 26 to interrupt the scan, by which the output of the image signal from the image sensor 23 is stopped and the overwriting of unprocessed line buffer data is prevented. Thereafter, the CPU 28 sets the "line buffer full suspension flag" to ON and advances to step S414.

In the step S411, the CPU 28 judges whether the "line buffer full suspension flag" is OFF or not. If the "line buffer full suspension flag" is OFF (S411: YES), the CPU 28 advances to the step S414. If the "line buffer full suspension flag" is ON (S411: NO) the CPU 28 advances to step S412.

The step S412 (performance measurement #2 of the line buffer 32) is not executed in the first embodiment.

In the next step S413, the CPU 28 instructs the image sensor control circuit 26 to resume the scan, sets the "line buffer full suspension flag" to OFF, and advances to the step S414.

In the step S414, the CPU 28 judges whether the "post-image processing DMA transfer in-execution flag" is OFF or not. The "post-image processing DMA transfer in-execution flag" is OFF at this point if the post-image processing DMA transfer has finished between S405 and S413. If the DMA transfer has not finished yet, the "post-image processing DMA transfer in-execution flag" is still ON at this point. If the "post-image processing DMA transfer in-execution flag" is OFF, that is, if the post-image processing DMA transfer has finished (S414: YES), the CPU 28 advances to the step S415. If the "post-image processing DMA transfer in-execution flag" is ON, that is, if the post-image processing DMA transfer has not finished yet (S414: NO), the CPU 28 advances to step S424.

In the step S415, the CPU 28 updates the "post-image processing buffer free space" by subtracting a data amount corresponding to the "post-image processing DMA transfer line number" (which was set upon the activation of the previous post-image processing DMA transfer) from the current "post-image processing buffer free space".

The "activation of the previous post-image processing DMA transfer" means the step S404 (when the step S415 is executed for the first time) or step S423 which will be explained later (when the step S415 is executed for the second time or later).

The next step S416 (performance measurement #3 of the post-image processing buffer 33) is not executed in the first embodiment.

In the next step S417, the CPU 28 judges whether or not the updated "post-image processing buffer free space" is a prescribed capacity or more. The "prescribed capacity" is a value as a criterion for the judgment on the buffer-full state. If the "post-image processing buffer free space" is the prescribed capacity or more (S417: YES), the CPU 28 (judging that the buffer-full state has not occurred in the post-image processing buffer 33) advances to step S420, otherwise (S417: NO) the CPU 28 (judging that the buffer-full state has occurred in the post-image processing buffer 33) advances to step S418.

In the step S418, the CPU 28 executes performance measurement #1 of the post-image processing buffer 33 (details will be explained later).

In the next step S419, the CPU 28 sets the "post-image processing buffer full suspension flag" to ON.

In the step S420, the CPU 28 judges whether the "post-image processing buffer full suspension flag" is OFF or not. If the "post-image processing buffer full suspension flag" is OFF (S420: YES), the CPU 28 advances to the step S423. If the "post-image processing buffer full suspension flag" is ON (S420: NO), the CPU 28 advances to step S421.

The step S421 (performance measurement #2 of the post-image processing buffer 33) is not executed in the first embodiment.

In the next step S422, the CPU 28 sets the "post-image processing buffer full suspension flag" to OFF.

In the step S423, the CPU 28 resets the "post-image processing DMA transfer line number" based on the "post-image processing buffer free space" updated in S415, activates the post-image processing DMA transfer again, sets the "post-image processing DMA transfer in-execution flag" to ON, and thereafter advances to the step S424.

In the step S424, the CPU 28 calculates "post-image processing buffer effective data capacity" (the amount of the post-image processing data stored in the post-image processing buffer 33) by subtracting the "post-image processing buffer free space" from the post-image processing buffer capacity.

In the next step S425, the CPU 28 judges whether or not the "post-image processing buffer effective data capacity" is a prescribed capacity or more. For example, in cases where the compression of the post-image processing data is carried out in units of 16 lines, the data amount of 16 lines corresponds to the "prescribed capacity". If the "post-image processing buffer effective data capacity" is less than the prescribed capacity (e.g. less than 16 lines) (S425: NO), the CPU 28 skips the compression process and directly advances to step S434 since the compression of the post-image processing data can not be executed at this point. If the "post-image processing buffer effective data capacity" is the prescribed capacity or more (S425: YES), the CPU 28 advances to step S426.

In the step S426, the CPU 28 judges whether or not the "compression buffer free space" is a prescribed capacity or more. The "prescribed capacity" is a value as a criterion for the judgment on the buffer-full state. If the "compression buffer free space" is the prescribed capacity or more (S426: YES), the CPU 28 (judging that the buffer-full state has not occurred in the compression buffer 34) advances to step S429, otherwise (S426: NO) the CPU 28 (judging that the buffer-full state has occurred in the compression buffer 34) advances to step S427.

In the step S427, the CPU 28 executes performance measurement #1 of the compression buffer 34 (details will be explained later).

In the next step S428, the CPU 28 sets the "compression buffer full suspension flag" to ON.

In the step S429, the CPU 28 judges whether the "compression buffer full suspension flag" is OFF or not. If the "compression buffer full suspension flag" is OFF (S429: YES), the CPU 28 advances to step S432, otherwise (S429: NO) the CPU 28 advances to step S430.

The step S430 (performance measurement #2 of the compression buffer 34) is not executed in the first embodiment.

In the next step S431, the CPU 28 sets the "compression buffer full suspension flag" to OFF.

In the step S432, the CPU 28 reads out the post-image processing data (for 16 lines, for example) from the post-image processing buffer 33, executes a prescribed compression process (e.g. JPEG compression) to the post-image processing data, writes the compressed post-image processing data into the compression buffer 34, increases the "post-image processing buffer free space" by the amount (before compression) of the post-image processing data, and decreases the "compression buffer free space" by the amount (after compression) of the compressed post-image processing data (compressed data) written to the compression buffer 34.

The next step S433 (performance measurement #3 of the compression buffer 34) is not executed in the first embodiment.

In the step S434, the CPU 28 judges whether the "I/F-transfer DMA transfer in-execution flag" is OFF or not. If the "I/F-transfer DMA transfer in-execution flag" is OFF (S434: YES), the CPU 28 advances to step S435, otherwise (S434: NO) the CPU 28 returns to the step S406.

When the step S434 is executed for the first time, the "I/F-transfer DMA transfer in-execution flag" is judged to be OFF since the flag has been set (initialized) to OFF in the step S405. Thus, the aforementioned reason for setting the "I/F-transfer DMA transfer in-execution flag" to OFF in the step S405 is to advance to the step S435 (S434: YES) at the first execution of the step S434.

In the step S435, the CPU 28 increases the "I/F transfer buffer free space" by the "I/F-transfer DMA transfer capacity" which was set upon the activation of previous I/F-transfer DMA transfer.

When the step S435 is executed for the first time, the I/F-transfer DMA transfer has not been activated yet. In this case, the "I/F transfer buffer free space" is not increased since the "I/F-transfer DMA transfer capacity" has been set at 0 in the step S405. Thus, the aforementioned reason for setting the "I/F-transfer DMA transfer capacity" at 0 in the step S405 is to prevent the "I/F transfer buffer free space" from increasing at the first execution of the step S435. When the step S435 is executed for the second time or later, the "activation of previous I/F-transfer DMA transfer" means step S444 which will be explained later.

In the next step S436, the CPU 28 calculates "compression buffer effective data capacity" (the amount of the compressed data stored in the compression buffer 34) by subtracting the "compression buffer free space" from the compression buffer capacity.

In the next step S437, the CPU 28 judges whether or not the "compression buffer effective data capacity" is a prescribed capacity or more. If the "compression buffer effective data capacity" is less than the prescribed capacity (S437: NO), the CPU 28 skips the transfer to the I/F transfer buffer 35 and returns to the step S406 since the transfer is impossible without sufficient compressed data in the compression buffer 34. If the "compression buffer effective data capacity" is the prescribed capacity or more (S437: YES), the CPU 28 advances to step S438.

In the step S438, the CPU 28 judges whether or not the "I/F transfer buffer free space" is a prescribed capacity or more.

The "prescribed capacity" is a value as a criterion for the judgment on the buffer-full state. If the "I/F transfer buffer free space" is the prescribed capacity or more (S438: YES), the CPU 28 (judging that the buffer-full state has not occurred in the I/F transfer buffer 35) advances to step S441, otherwise (S438: NO) the CPU 28 (judging that the buffer-full state has occurred in the I/F transfer buffer 35) advances to step S439.

In the step S439, the CPU 28 executes performance measurement #1 of the I/F transfer buffer 35 (details will be explained later).

In the next step S440, the CPU 28 sets the "I/F transfer buffer full suspension flag" to ON.

In the step S441, the CPU 28 judges whether the "I/F transfer buffer full suspension flag" is OFF or not. If the "I/F transfer buffer full suspension flag" is OFF (S441: YES), the CPU 28 advances to the step S444, otherwise (S441: NO) the CPU 28 advances to step S442.

The step S442 (performance measurement #2 of the I/F transfer buffer 35) is not executed in the first embodiment.

In the next step S443, the CPU 28 sets the "I/F transfer buffer full suspension flag" to OFF.

In the step S444, the CPU 28 reads out the compressed data from the compression buffer 34, converts the compressed data into the I/F transfer data (in a format suitable for the interface), writes the I/F transfer data into the I/F transfer buffer 35, increases the "compression buffer free space" by the amount of the compressed data read out from the compression buffer 34, decreases the "I/F transfer buffer free space" by the amount of the I/F transfer data written to the I/F transfer buffer 35, sets the "I/F-transfer DMA transfer capacity" at the amount of the I/F transfer data written to the I/F transfer buffer 35, activates the I/F-transfer DMA transfer, and sets the "I/F-transfer DMA transfer in-execution flag" to ON.

The next step S445 (performance measurement #3 of the I/F transfer buffer 35) is not executed in the first embodiment.

After the step S445, the CPU 28 returns to the step S406 and repeats the process from S406.

(1-3-4) Performance Measurement #1

In the first embodiment, the performance measurement #1 of the line buffer 32, the performance measurement #1 of the post-image processing buffer 33, the performance measurement #1 of the compression buffer 34 and the performance measurement #1 of the I/F transfer buffer 35 are executed in the same way for each buffer.

Figure 10:
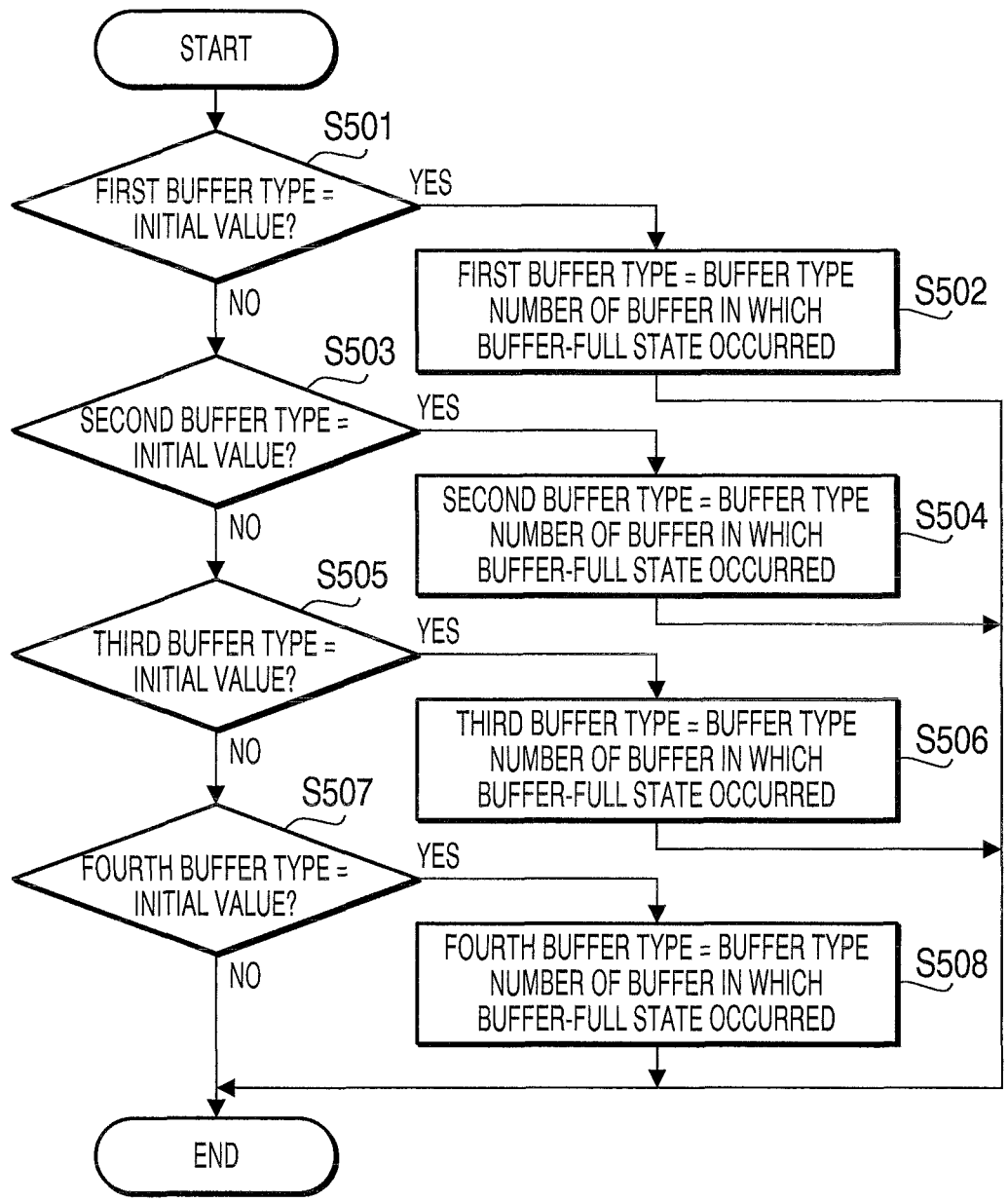
FIG. 10 is a flow chart showing the process flow of performance measurement #1.

FIG. 10 is a flow chart showing the process flow of the performance measurement #1.

In step S501, the CPU 28 judges whether or not the variable "first buffer type" still remains at the initial value which was set in S305. If the "first buffer type" remains at the initial value (S501: YES), the CPU 28 advances to step S502, otherwise (S501: NO) the CPU 28 advances to step S503.

In the step S502, the CPU 28 sets the variable "first buffer type" at the buffer type number assigned to the buffer in which the buffer-full state has occurred. For example, when the performance measurement #1 is activated as the "performance measurement #1 of the line buffer 32", the "buffer in which the buffer-full state has occurred" is the line buffer 32. In this case, the variable "first buffer type" is set at the buffer type number assigned to the line buffer 32. After setting the variable "first buffer type" at the particular buffer type number, the CPU 28 ends the process of FIG. 10.

The process from S503 to S508 is substantially identical with the above process from S501 to S502, and thus repeated explanation thereof is omitted.

By the performance measurement #1, the variable "first buffer type" is set at the buffer type number of the buffer in which the buffer-full state occurred first, and the variable "second buffer type" is set at the buffer type number of the buffer in which the buffer-full state occurred next. Similarly, the variable "fourth buffer type" is set at the buffer type number of the buffer in which the buffer-full state occurred last.

(1-3-5) Buffer Capacity Changing Process

Figure 11:
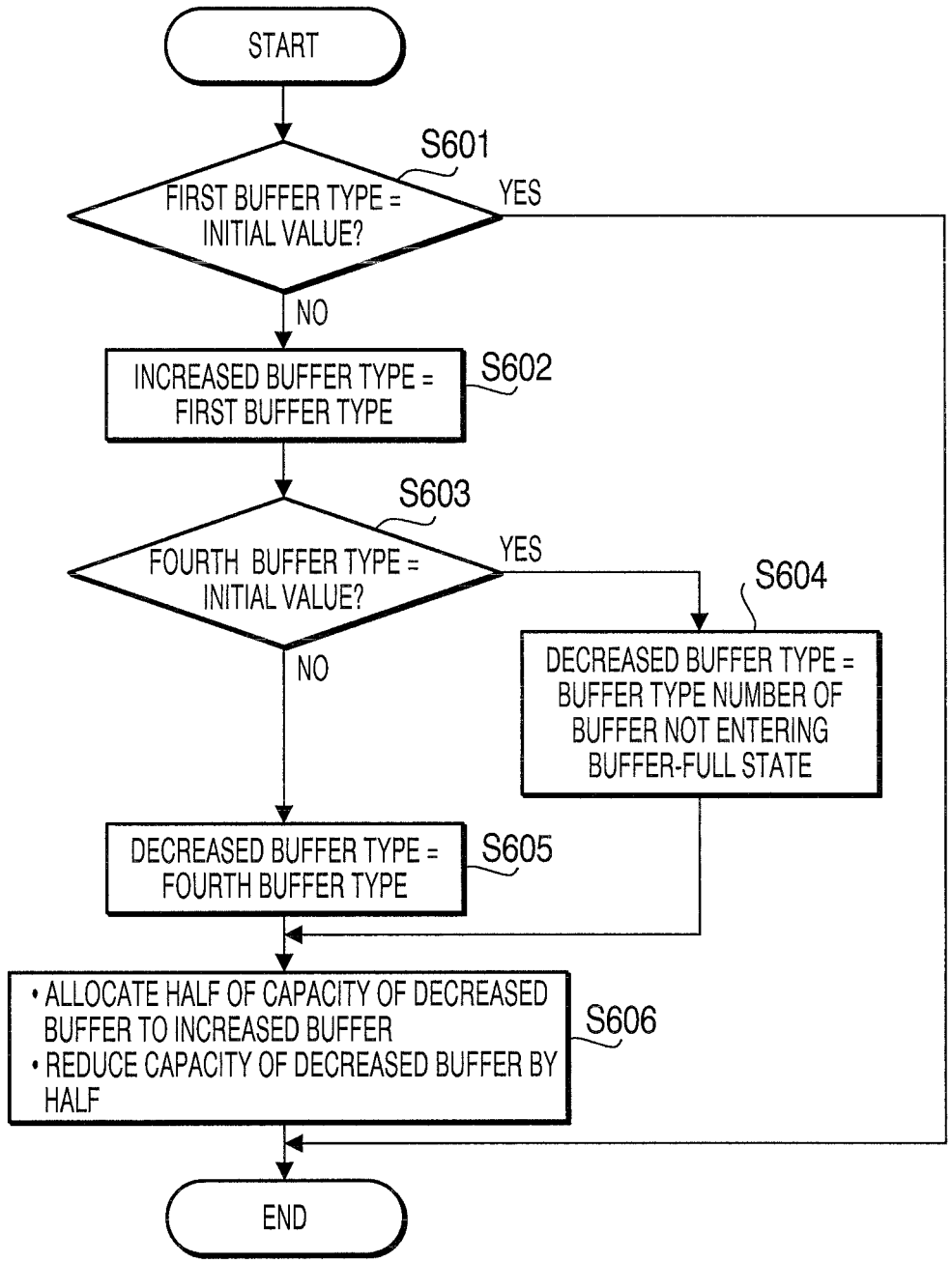
FIG. 11 is a flow chart showing the process flow of a buffer capacity changing process (based on performance measurement result) included in the process of FIG. 3.

FIG. 11 is a flow chart showing the process flow of the buffer capacity changing process (based on performance measurement result).

In step S601, the CPU 28 judges whether or not the variable "first buffer type" still remains at the initial value which was set in S305. If the "first buffer type" remains at the initial value (S601: YES), it means that the buffer-full state has not occurred in any of the buffers. In this case, it can be inferred that the storage capacity of each buffer is appropriate as a whole and the changing of the storage area allocation between buffers is unnecessary. Thus, in this case where the "first buffer type" is at the initial value (S601: YES), the CPU 28 ends the buffer capacity changing process. If the "first buffer type" is not at the initial value (S601: NO), the CPU 28 advances to step S602.

In the step S602, the CPU 28 sets a variable "increased buffer type" at the buffer type number at which the variable "first buffer type" has been set (i.e. current value of the "first buffer type").

In the next step S603, the CPU 28 judges whether or not the variable "fourth buffer type" still remains at the initial value which was set in S305. If the "fourth buffer type" remains at the initial value (S603: YES), it means that the buffer-full state has not occurred in at least one of the buffers. In this case (S603: YES), the CPU 28 advances to step S604, otherwise (S603: NO) the CPU advances to step S605.

In the step S604, the CPU 28 sets a variable "decreased buffer type" at the buffer type number of a buffer in which the buffer-full state has not occurred. When there are two or more buffers in which the buffer-full state has not occurred, the "decreased buffer type" may be set at the buffer type number of any buffer arbitrarily or properly selected from the two or more buffers. Thereafter, the CPU 28 advances to step S606.

In the step S605, the CPU 28 sets the variable "decreased buffer type" at the current value of the "fourth buffer type".

In the step S606, the CPU 28 allocates half of the storage area of the buffer (whose buffer type number is) represented by the "decreased buffer type" to the buffer (whose buffer type number is) represented by the "increased buffer type".

For example, when the decreased buffer (buffer represented by the "decreased buffer type") is the I/F transfer buffer 35 and the increased buffer (buffer represented by the "increased buffer type") is the post-image processing buffer 33, the storage area allocation is changed between the two buffers 33 and 35 as follows:

I/F transfer buffer capacity=1 MB/2=0.5 MB
post-image processing buffer capacity=5 MB+0.5 MB=5.5 MB A buffer (buffer area) in which the buffer-full state occurred relatively early among the buffers can be regarded to have a high probability of the buffer-full state in the future. On the other hand, a buffer (buffer area) in which the buffer-full state occurred relatively late among the buffers (or a buffer in which the buffer-full state occurred last or did not occur) can be regarded to have a low probability of the buffer-full state in the future. Therefore, by increasing the storage area allocation to a buffer entering the buffer-full state relatively early among the buffers and decreasing the storage area allocation to a buffer entering the buffer-full state relatively late among the buffers as above, the probability of the occurrence of the buffer-full state in a buffer can be reduced and the performance of the MFP 1 can be improved excellently.

As described above, in the MFP 1 in accordance with the first embodiment of the present invention, the CPU 28 changes the storage area allocation at least between two buffers based on the usage status of each buffer, by which the performance of the MFP 1 can be improved without the need of user operations for changing the storage area allocation. Thus, the allocation of storage areas to multiple buffers is facilitated remarkably by the first embodiment.

Further, the MFP 1 of the first embodiment acquires each buffer's usage status from the image scanning of the first page of the document to the transmission of the image data of the first page, without acquiring each buffer's usage status from the image scanning to the image data transmission of the whole document (all pages). Therefore, the scanning of the subsequent pages (second page or later) can be executed in a desirable state (in which the storage area allocation has been changed properly among multiple buffers) and the performance in the scanning of the subsequent pages can be increased excellently.

<Embodiment 2>

In the following, a second embodiment in accordance with the present invention will be described referring to FIGS. 12-14.

In the second embodiment, the storage area allocation to a buffer entering the buffer-full state a large number of times is increased while decreasing the storage area allocation to a buffer in which the number of times of the buffer-full state is small (e.g. 0).

(2-1) Performance Measurement Starting Process

Figure 12:
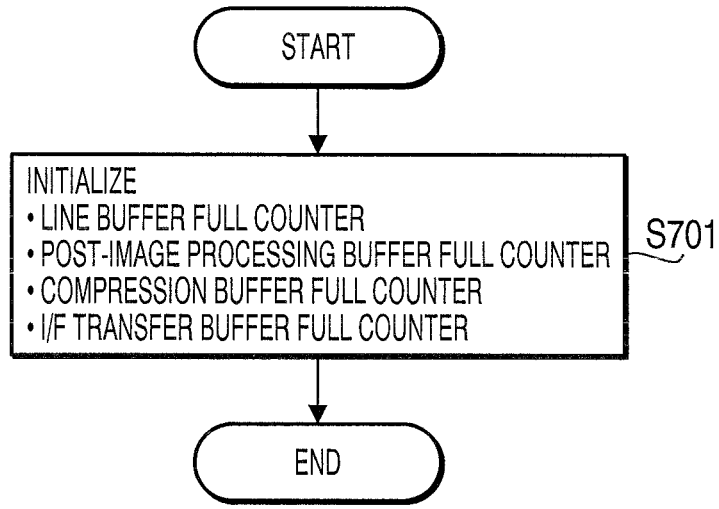
FIG. 12 is a flow chart of the performance measurement starting process which is executed in a second embodiment of the present invention.

FIG. 12 is a flow chart of the performance measurement starting process (S125 in FIG. 3) which is executed in the second embodiment.

In step S701, the CPU 28 initializes variables (counters) which are used for counting the number of times of the buffer-full state occurring in each buffer ("line buffer full counter", "post-image processing buffer full counter", "compression buffer full counter", "I/F transfer buffer full counter"). By the initialization, each variable (counter) is set at 0 (indicating that no buffer-full state has occurred).

(2-2) Performance Measurement Scanning Process

In the performance measurement scanning process (S130 in FIG. 3) in the second embodiment, the performance measurement #2 and the performance measurement #3 are not executed for any buffer similarly to the first embodiment.

(2-3) Performance Measurement #1

In the second embodiment, the performance measurement #1 is executed differently for each buffer. Since the contents of the performance measurement #1 are substantially identical among the buffers, the performance measurement #1 of the line buffer 32 will be explained below as a typical example.

Figure 13:
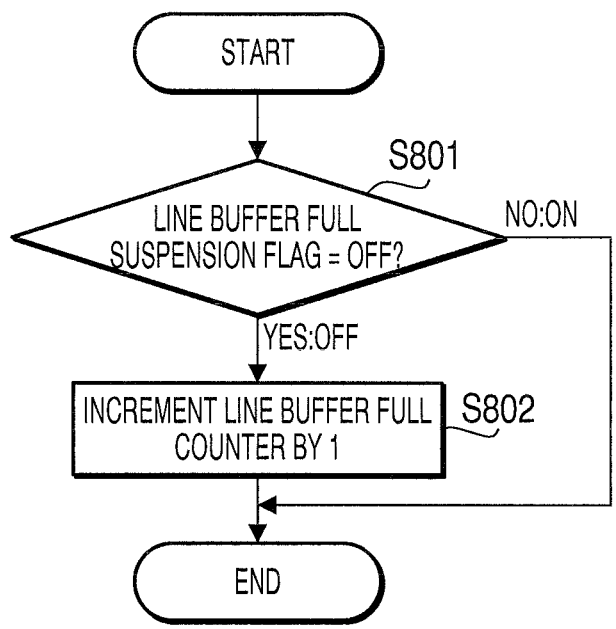
FIG. 13 is a flow chart showing the process flow of the performance measurement #1 of a line buffer which is executed in the second embodiment.

FIG. 13 is a flow chart showing the process flow of the performance measurement #1 of the line buffer 32 which is executed in the second embodiment.

In step S801, the CPU 28 judges whether the "line buffer full suspension flag" is OFF or not. If the "line buffer full suspension flag" is OFF (S801: YES), the CPU 28 advances to step S802, otherwise (S801: NO) the CPU 28 ends the process (performance measurement #1).

The process of FIG. 13 is ended when the "line buffer full suspension flag" is ON (S801: NO) so that the occurrence of one buffer-full state will not be counted redundantly (twice or more). The "line buffer full suspension flag" already set to ON means that the performance measurement #1 of the line buffer 32 (S409) has already been executed and the number of times ("line buffer full counter") has already been incremented (since the "line buffer full suspension flag" is set to ON in S410 just after the execution of the performance measurement #1 of the line buffer 32 (S409)). Incidentally, the redundant counting (not necessarily causing a problem) may also be employed as one possible method.

In the step S802, the CPU 28 increments the "line buffer full counter" by 1.

(2-4) Buffer Capacity Changing Process (Based on Performance Measurement Result)

Figure 14:
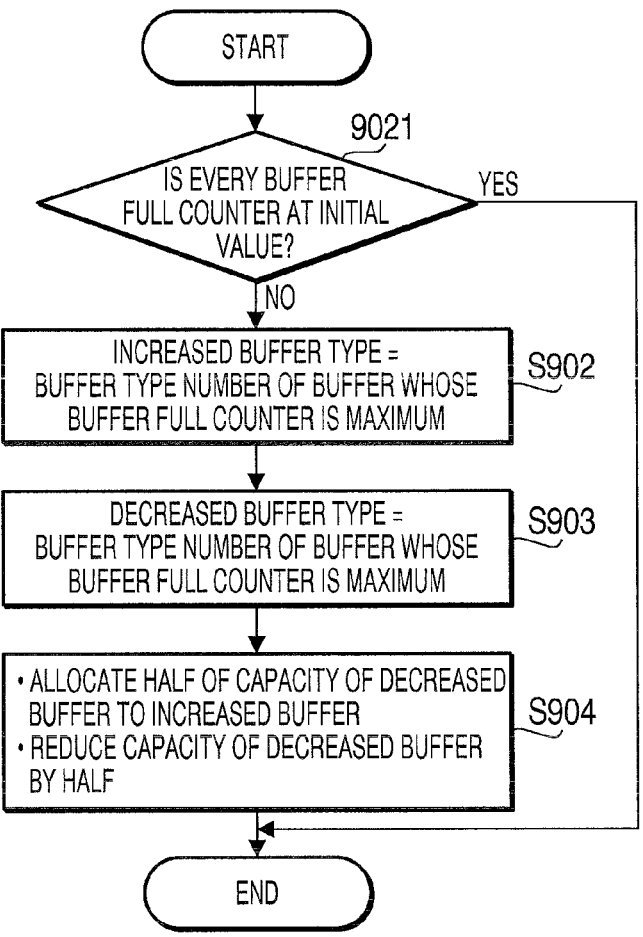
FIG. 14 is a flow chart showing the process flow of the buffer capacity changing process (based on performance measurement result) which is executed in the second embodiment.

FIG. 14 is a flow chart showing the process flow of the buffer capacity changing process (based on performance measurement result) which is executed in the second embodiment.

In step S901, the CPU 28 judges whether or not all the buffer full counters for the buffers 32, 33, 34 and 35 are still at the initial values (0). If affirmative (S901: YES), it means that the buffer-full state has not occurred in any of the buffers. In this case, it can be inferred that the storage capacity of each buffer is appropriate as a whole and the changing of the storage area allocation between buffers is unnecessary. Thus, in this case where all the buffer full counters are at the initial values (S901: YES), the CPU 28 ends the buffer capacity changing process. If any one of the buffer full counters is not at the initial value (S901: NO), the CPU 28 advances to step S902.

In the step S902, the CPU 28 sets the variable "increased buffer type" at the buffer type number of the buffer whose buffer full counter is the maximum among the buffers.

In the next step S903, the CPU 28 sets the variable "decreased buffer type" at the buffer type number of the buffer whose buffer full counter is the minimum among the buffers.

In the next step S904, the CPU 28 allocates half of the storage area of the buffer (whose buffer type number is) represented by the "decreased buffer type" to the buffer (whose buffer type number is) represented by the "increased buffer type".

For example, when the decreased buffer (buffer represented by the "decreased buffer type") is the compression buffer 34 and the increased buffer (buffer represented by the "increased buffer type") is the post-image processing buffer 33, the storage area allocation is changed between the two buffers 33 and 34 as follows:

compression buffer capacity=1 MB/2=0.5 MB post-image processing buffer capacity=5 MB+0.5 MB=5.5 MB A buffer in which the buffer-full state occurred a large number of times can be regarded to have a high probability of the buffer-full state in the future. On the other hand, a buffer in which the buffer-full state did not occur or occurred a small number of times can be regarded to have a low probability of the buffer-full state in the future. Therefore, by increasing the storage area allocation to a buffer frequently entering the buffer-full state and decreasing the storage area allocation to a buffer rarely entering the buffer-full state as above, the probability of the occurrence of the buffer-full state in a buffer can be reduced and the performance of the MFP 1 can be improved excellently.

<Embodiment 3>

In the following, a third embodiment in accordance with the present invention will be described referring to FIGS. 15-18.

In the third embodiment, the storage area allocation to a buffer in which the duration of the buffer-full state is long is increased while decreasing the storage area allocation to a buffer in which the duration of the buffer-full state is short.

(3-1) Performance Measurement Starting Process

Figure 15:
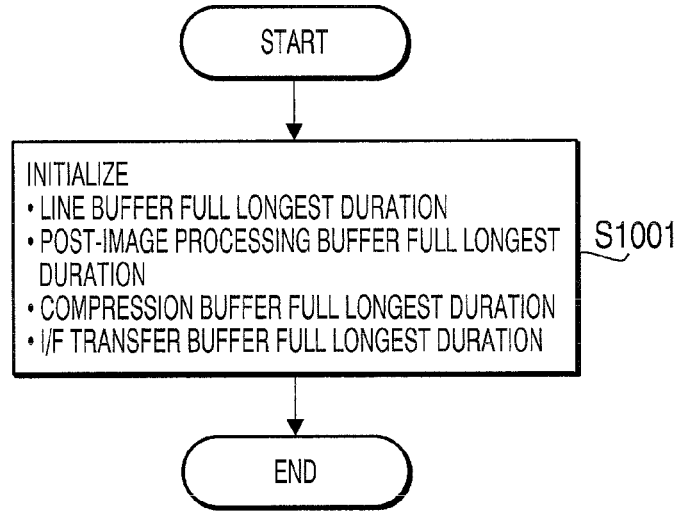
FIG. 15 is a flow chart of the performance measurement starting process which is executed in a third embodiment of the present invention.

FIG. 15 is a flow chart of the performance measurement starting process (S125 in FIG. 3) which is executed in the third embodiment.

In step S1001, the CPU 28 initializes variables which are used for recording the longest duration of the buffer-full state occurring in each buffer ("line buffer full longest duration", "post-image processing buffer full longest duration", "compression buffer full longest duration", "I/F transfer buffer full longest duration"). By the initialization, the variables are set at 0 msec (initial value).

(3-2) Performance Measurement Scanning Process

In the performance measurement scanning process (S130 in FIG. 3) in the third embodiment, the performance measurement #1 and the performance measurement #2 are executed for every buffer, while the performance measurement #3 is not executed for any buffer.

(3-3) Performance Measurement #1

Also in the third embodiment, the performance measurement #1 is executed differently for each buffer. Since the contents of the performance measurement #1 are substantially identical among the buffers, the performance measurement #1 of the line buffer 32 will be explained below as a typical example.

Figure 16:
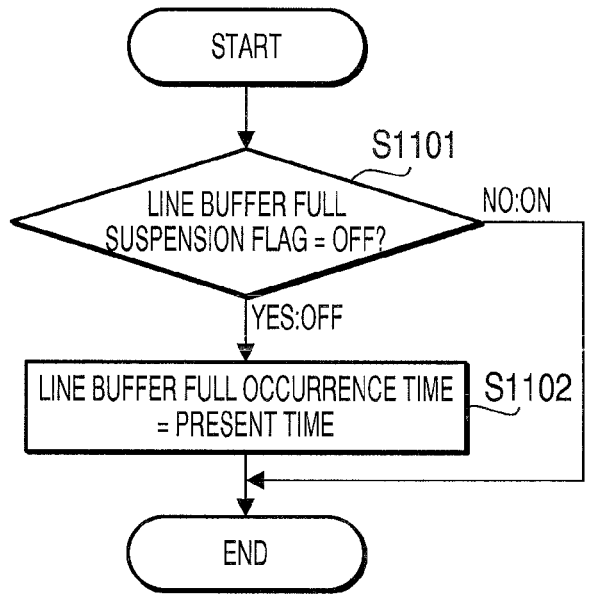
FIG. 16 is a flow chart showing the process flow of the performance measurement #1 of the line buffer which is executed in the third embodiment.

FIG. 16 is a flow chart showing the process flow of the performance measurement #1 of the line buffer 32 which is executed in the third embodiment.

In step S1101, the CPU 28 judges whether the "line buffer full suspension flag" is OFF or not. If the "line buffer full suspension flag" is OFF (S1101: YES), the CPU 28 advances to step S1102, otherwise (S1101: NO) the CPU 28 ends the process (performance measurement #1).

In the step S1102, the CPU 28 sets a variable "line buffer full occurrence time" (which is used for recording the time of occurrence of the buffer-full state in the line buffer 32) at the present time.

(3-4) Performance Measurement #2

Since the contents of the performance measurement #2 are also substantially identical among the buffers, the performance measurement #2 of the line buffer 32 will be explained below as a typical example.

Figure 17:
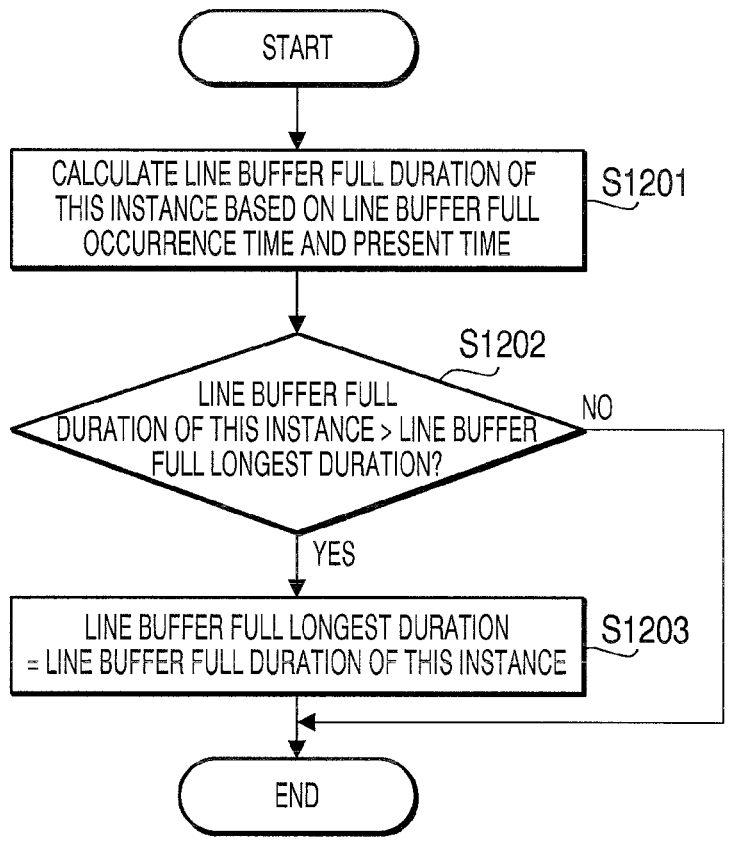
FIG. 17 is a flow chart showing the process flow of performance measurement #2 of the line buffer which is executed in the third embodiment.

FIG. 17 is a flow chart showing the process flow of the performance measurement #2 of the line buffer 32 which is executed in the third embodiment.

In step S1201, the CPU 28 calculates the time difference between the present time and the time held by the variable "line buffer full occurrence time" and regards the obtained time difference as "line buffer full duration" of this instance.

In the next step S1202, the CPU 28 judges whether or not the "line buffer full duration" of this instance is longer than the "line buffer full longest duration". If affirmative (S1202: YES), the CPU 28 advances to step S1203, otherwise (S1202: NO) the CPU 28 ends the process (performance measurement #2).

In the step S1203, the CPU 28 sets the variable "line buffer full longest duration" at the "line buffer full duration" of this instance.

(3-5) Buffer Capacity Changing Process (Based on Performance Measurement Result)

Figure 18:
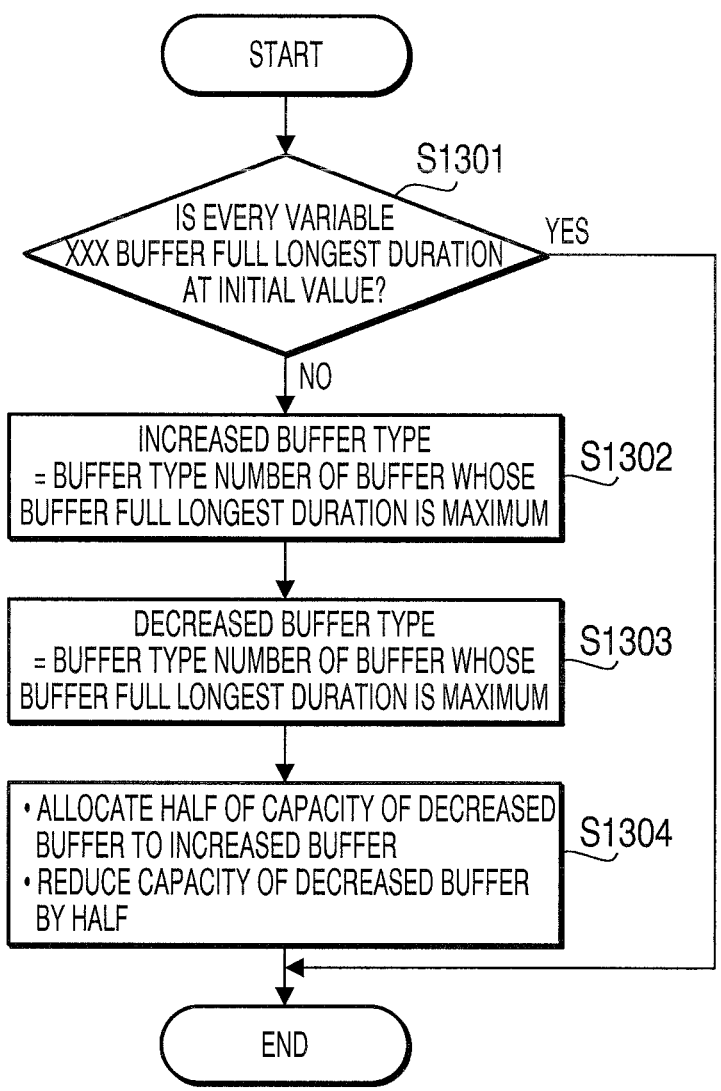
FIG. 18 is a flow chart showing the process flow of the buffer capacity changing process (based on performance measurement result) which is executed in the third embodiment.

FIG. 18 is a flow chart showing the process flow of the buffer capacity changing process (based on performance measurement result) which is executed in the third embodiment.

In step S1301, the CPU 28 judges whether or not all the variables "XXX buffer full longest duration" (XXX buffer: buffer name) for the buffers 32, 33, 34 and 35 are still at the initial values (0 msec). If affirmative (S1301: YES), it means that the buffer-full state has not occurred in any of the buffers. In this case (S1301: YES), the CPU 28 ends the buffer capacity changing process. If negative, that is, if any one of the variables "XXX buffer full longest duration" is not at the initial value (S1301: NO), the CPU 28 advances to step S1302.

In the step S1302, the CPU 28 sets the variable "increased buffer type" at the buffer type number of the buffer whose variable "XXX buffer full longest duration" is the maximum among the buffers.

In the next step S1303, the CPU 28 sets the variable "decreased buffer type" at the buffer type number of the buffer whose variable "XXX buffer full longest duration" is the minimum among the buffers.

In the next step S1304, the CPU 28 allocates half of the storage area of the buffer (whose buffer type number is) represented by the "decreased buffer type" to the buffer (whose buffer type number is) represented by the "increased buffer type".

For example, when the decreased buffer (buffer represented by the "decreased buffer type") is the compression buffer 34 and the increased buffer (buffer represented by the "increased buffer type") is the I/F transfer buffer 35, the storage area allocation is changed between the two buffers 34 and 35 as follows:

compression buffer capacity=1 MB/2=0.5 MB
I/F transfer buffer capacity=1 MB+0.5 MB=1.5 MB
A buffer whose "XXX buffer full longest duration" is long can be regarded to have a high probability of the buffer-full state in the future. On the other hand, a buffer whose "XXX buffer full longest duration" is short can be regarded to have a low probability of the buffer-full state in the future. Therefore, by increasing the storage area allocation to a buffer having long "XXX buffer full longest duration" and decreasing the storage area allocation to a buffer having short "XXX buffer full longest duration" as above, the probability of the occurrence of the buffer-full state in a buffer can be reduced and the performance of the MFP 1 can be improved excellently.

<Embodiment 4>

In the following, a fourth embodiment in accordance with the present invention will be described referring to FIGS. 19-21.

In the fourth embodiment, when the storage area allocation to a not entering the buffer-full state (buffer in which the buffer-full state has not occurred) is decreased, the storage area of the buffer (decreased buffer) is reduced by its "minimum free space" (explained later) while increasing the storage area allocation to a different buffer (increased buffer) by the minimum free space of the decreased buffer.

(4-1) Performance Measurement Starting Process

Figure 19:
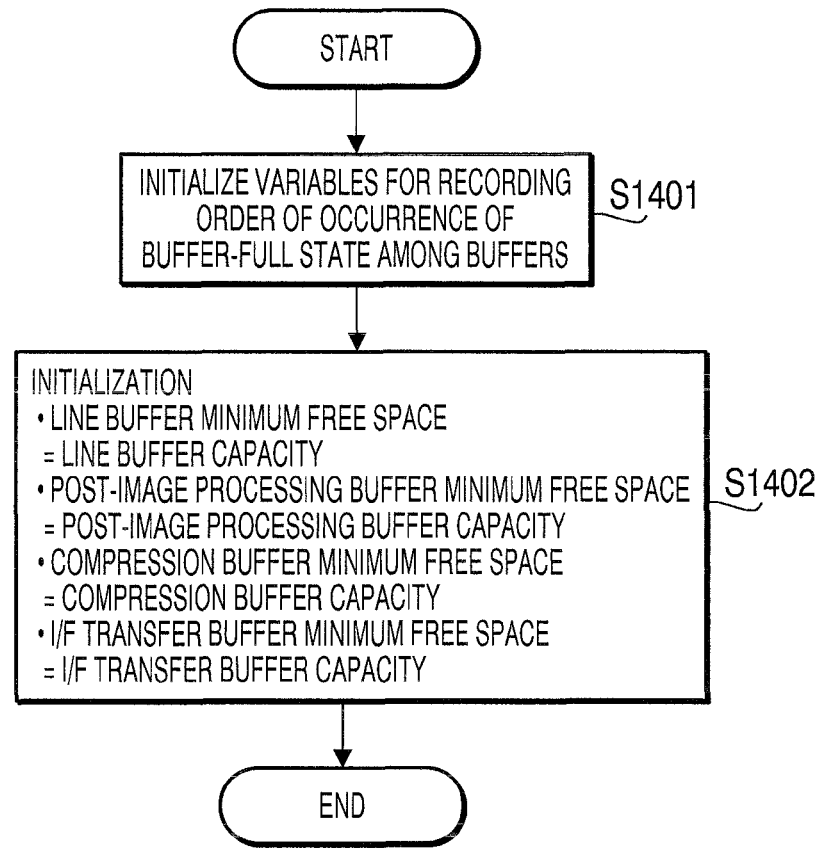
FIG. 19 is a flow chart of the performance measurement starting process which is executed in a fourth embodiment of the present invention.

FIG. 19 is a flow chart of the performance measurement starting process (S125 in FIG. 3) which is executed in the fourth embodiment.

In step S1401, the CPU 28 initializes the variables "first buffer type", "second buffer type", "third buffer type" and "fourth buffer type" to be used for recording the order of occurrence of the buffer-full state among the buffers 32, 33, 34 and 35.

In the next step S1402, the CPU 28 initializes variables for recording the "minimum free space" of each buffer ("line buffer minimum free space", "post-image processing buffer minimum free space", "compression buffer minimum free space", "I/F transfer buffer minimum free space"). By the initialization, the variables are set at the line buffer capacity, the post-image processing buffer capacity, the compression buffer capacity and the I/F transfer buffer capacity, respectively (initial values).

(4-2) Performance Measurement Scanning Process

In the performance measurement scanning process (S130 in FIG. 3) in the fourth embodiment, the performance measurement #1 and the performance measurement #3 are executed for every buffer, while the performance measurement #2 is not executed for any buffer.

(4-3) Performance Measurement #1

The performance measurement #1 in the fourth embodiment is identical with that in the first embodiment (the same process is called up for each buffer), and thus repeated explanation thereof is omitted.

(4-4) Performance Measurement #3

The performance measurement #3 is executed differently for each buffer. Since the contents of the performance measurement #3 are substantially identical among the buffers, the performance measurement #3 of the line buffer 32 will be explained below as a typical example.

Figure 20:
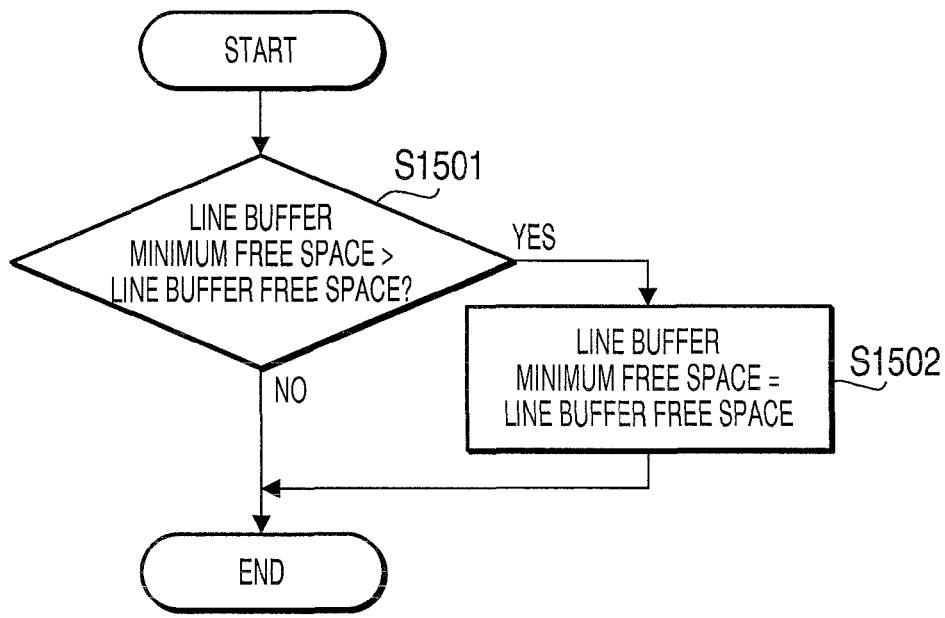
FIG. 20 is a flow chart showing the process flow of performance measurement #3 of the line buffer which is executed in the fourth embodiment.

FIG. 20 is a flow chart showing the process flow of the performance measurement #3 of the line buffer 32 which is executed in the fourth embodiment.

In step S1501, the CPU 28 acquires information on current free space of the line buffer 32 and judges whether the variable "line buffer minimum free space" is larger than the current free space. If the "line buffer minimum free space" is larger than the current free space (S1501: YES), the CPU 28 advances to step S1502, otherwise (S1501: NO) the CPU 28 ends the process (performance measurement #3).

In the step S1502, the CPU 28 sets the variable "line buffer minimum free space" at the current free space.

(4-5) Buffer Capacity Changing Process (Based on Performance Measurement Result)

Figure 21:
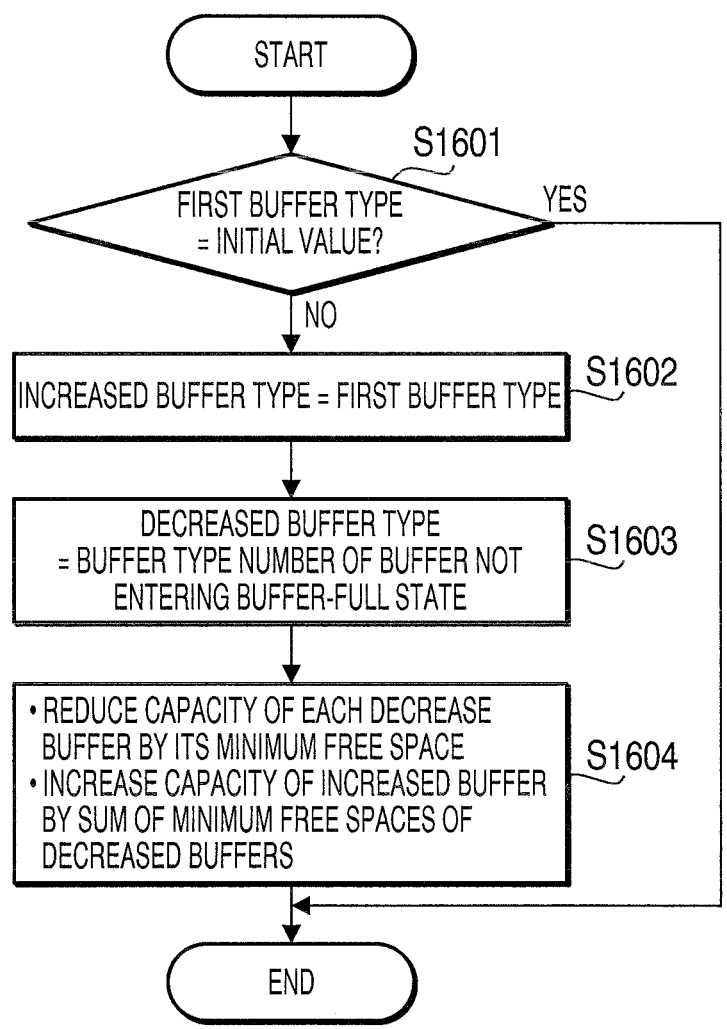
FIG. 21 is a flow chart showing the process flow of the buffer capacity changing process (based on performance measurement result) which is executed in the fourth embodiment.

FIG. 21 is a flow chart showing the process flow of the buffer capacity changing process (based on performance measurement result) which is executed in the fourth embodiment.

In step S1601, the CPU 28 judges whether or not the variable "first buffer type" still remains at the initial value which was set in S1401. If the "first buffer type" remains at the initial value (S1601: YES), it means that the buffer-full state has not occurred in any of the buffers. Thus, the CPU 28 in this case (S601: YES) ends the buffer capacity changing process without changing the storage area allocation. If the "first buffer type" is not at the initial value (S1601: NO), the CPU 28 advances to step S1602.

In the step S1602, the CPU 28 sets the variable "increased buffer type" at the buffer type number at which the variable "first buffer type" has been set (i.e. the current value of the "first buffer type"), by which the buffer entering the buffer-full state first is specified as the target of increasing the storage capacity.

In the next step S1603, the CPU 28 sets the variable "decreased buffer type" at the buffer type number of a buffer in which the buffer-full state has not occurred. When there are two or more buffers in which the buffer-full state has not occurred, the "decreased buffer type" is set at the buffer type numbers of the two or more buffers, that is, the buffer type numbers of the two or more buffers are stored as the variables "decreased buffer type".

In the next step S1604, the CPU 28 allocates the minimum free space of each buffer (whose buffer type number is) represented by the "decreased buffer type" to the buffer (whose buffer type number is) represented by the "increased buffer type".

For example, when the compression buffer 34 and the I/F transfer buffer 35 are the decreased buffers (buffers represented by the "decreased buffer type"), the post-image processing buffer 33 is the increased buffer (buffer represented by the "increased buffer type"), and the minimum free spaces of the compression buffer 34 and the I/F transfer buffer 35 are 0.8 MB and 0.3 MB, respectively, the storage area allocation is changed among the three buffers 33, 34 and 35 as follows:

compression buffer capacity=1 MB−0.8 MB=0.2 MB

I/F transfer buffer capacity=1 MB−0.3 MB=0.7 MB post-image processing buffer capacity=5 MB+0.8 MB+0.3 MB=6.1 MB Incidentally, when the buffer-full state has occurred in every buffer, it is possible to reduce the storage area of the buffer entering the buffer-full state last similarly to the first embodiment.

As described above, when the storage area allocation to a buffer not entering the buffer-full state (decreased buffer) is decreased in the fourth embodiment, the storage area of the decreased buffer is reduced by its minimum free space while increasing the storage area allocation to a different buffer (increased buffer) by the same amount (i.e. the minimum free space of the decreased buffer), by which excessive reduction of the storage area of the decreased buffer can be prevented and the storage area allocation to the buffers can be carried out more appropriately.

<Embodiment 5>

In the following, a fifth embodiment in accordance with the present invention will be described referring to FIGS. 22-25.

In the fifth embodiment, the storage area of the buffer having the shortest duration of the buffer-full state among buffers other than the buffer entering the buffer-full state first is decreased while increasing the storage area of the buffer entering the buffer-full state first by the same amount.

(5-1) Performance Measurement Starting Process

Figure 22:
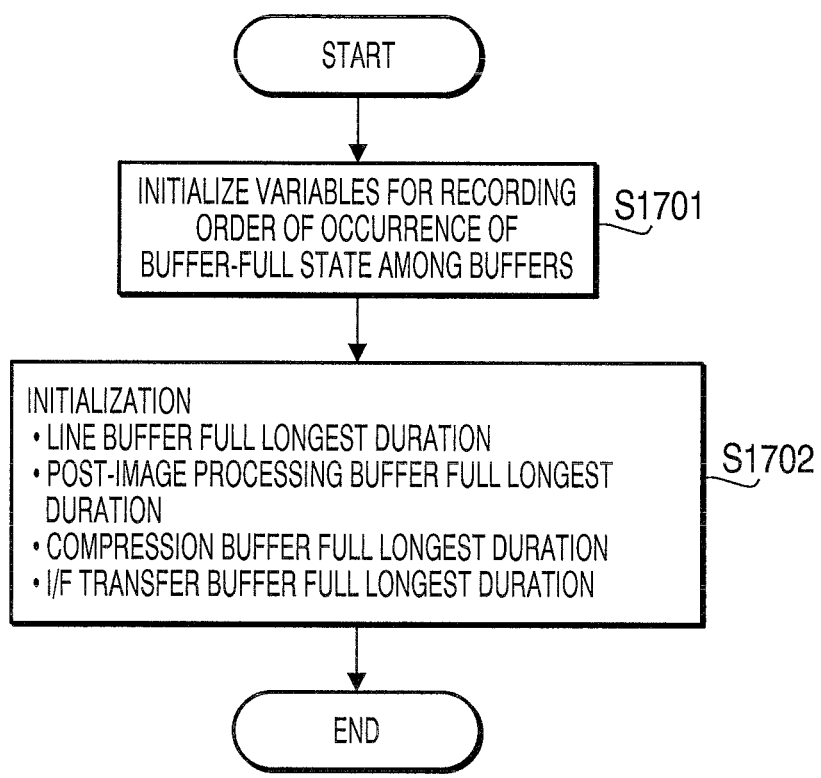
FIG. 22 is a flow chart of the performance measurement starting process which is executed in a fifth embodiment of the present invention.

FIG. 22 is a flow chart of the performance measurement starting process (S125 in FIG. 3) which is executed in the fifth embodiment.

In step S1701, the CPU 28 initializes the variables "first buffer type", "second buffer type", "third buffer type" and "fourth buffer type" to be used for recording the order of occurrence of the buffer-full state among the buffers 32, 33, 34 and 35.

In the next step S1702, the CPU 28 initializes the variables "line buffer full longest duration", "post-image processing buffer full longest duration", "compression buffer full longest duration" and "I/F transfer buffer full longest duration" to be used for recording the longest duration of the buffer-full state occurring in each buffer. By the initialization, the variables are set at 0 msec (initial value).

(5-2) Performance Measurement Scanning Process

In the performance measurement scanning process (S130 in FIG. 3) in the fifth embodiment, the performance measurement #1 and the performance measurement #2 are executed for every buffer, while the performance measurement #3 is not executed for any buffer.

(5-3) Performance Measurement #1

Also in the fifth embodiment, the performance measurement #1 is executed differently for each buffer. Since the contents of the performance measurement #1 are substantially identical among the buffers, the performance measurement #1 of the line buffer 32 will be explained below as a typical example.

Figure 23:
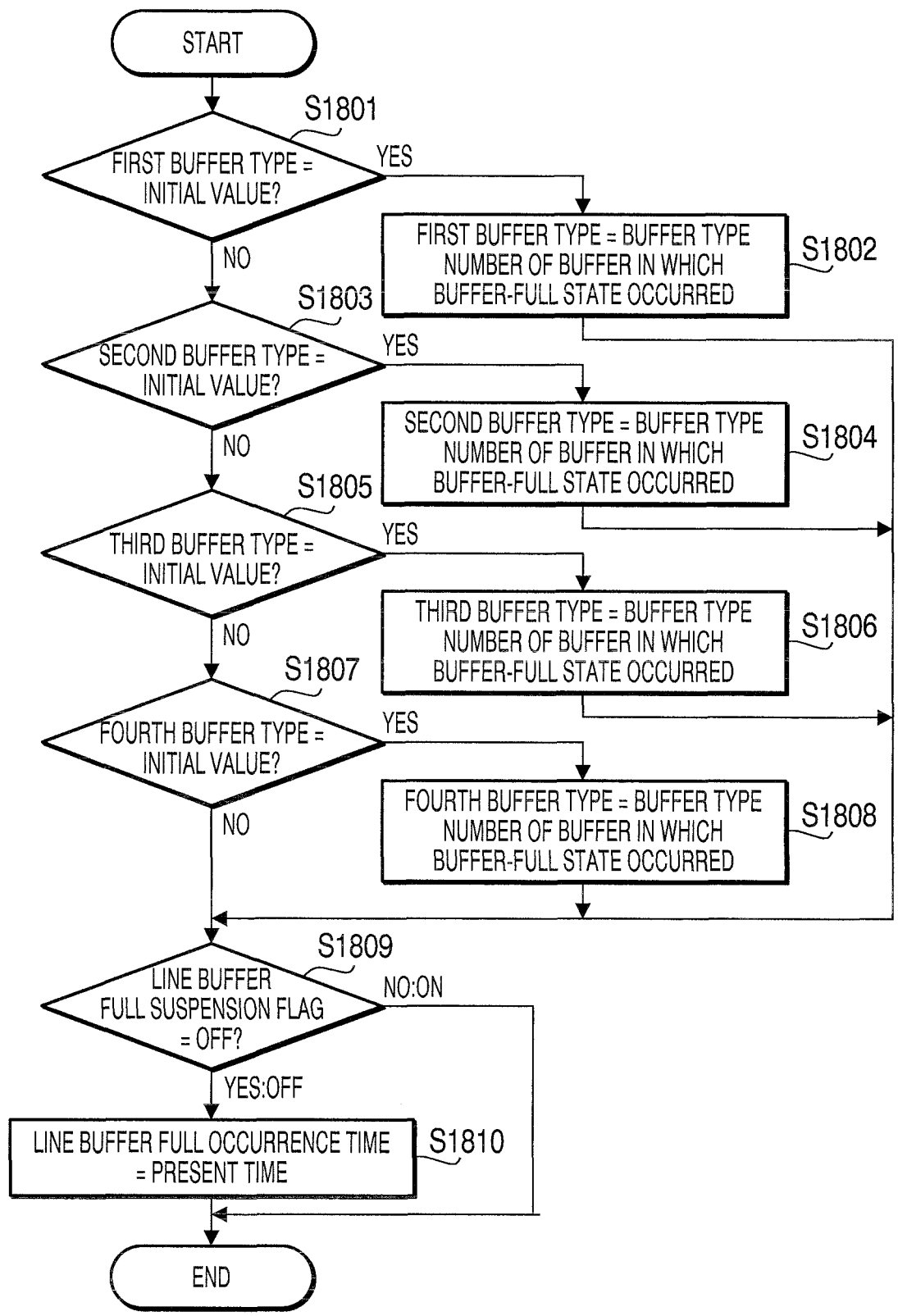
FIG. 23 is a flow chart showing the process flow of the performance measurement #1 of the line buffer which is executed in the fifth embodiment.

FIG. 23 is a flow chart showing the process flow of the performance measurement #1 of the line buffer 32 which is executed in the fifth embodiment. Incidentally, the variables "first buffer type", "second buffer type", "third buffer type"

and "fourth buffer type" in the fifth embodiment are global variables (accessible in common from the performance measurement #1 of any other buffer).

In step S1801, the CPU 28 judges whether or not the variable "first buffer type" still remains at the initial value which was set in S1701. If the "first buffer type" remains at the initial value (S1801: YES), the CPU 28 advances to step S1802, otherwise (S1801: NO) the CPU 28 advances to step S1803.

In the step S1802, the CPU 28 sets the variable "first buffer type" at the buffer type number of the buffer in which the buffer-full state has occurred. In this example (performance measurement #1 of the line buffer 32), the variable "first buffer type" is set at the buffer type number of the line buffer 32 since the "buffer in which the buffer-full state has occurred" is the line buffer 32. After setting the variable "first buffer type" at the particular buffer type number, the CPU 28 advances to step S1809.

The process from S1803 to S1808 is substantially identical with the above process from S1801 to S1802, and thus repeated explanation thereof is omitted.

In the step S1809, the CPU 28 judges whether the "line buffer full suspension flag" is OFF or not. If the "line buffer full suspension flag" is OFF (S1809: YES), the CPU 28 advances to step S1810, otherwise (S1809: NO) the CPU 28 ends the process (performance measurement #1).

In the step S1810, the CPU 28 sets the variable "line buffer full occurrence time" at the present time.

(5-4) Performance Measurement #2

Since the contents of the performance measurement #2 are also substantially identical among the buffers, the performance measurement #2 of the line buffer 32 will be explained below as a typical example.

Figure 24:
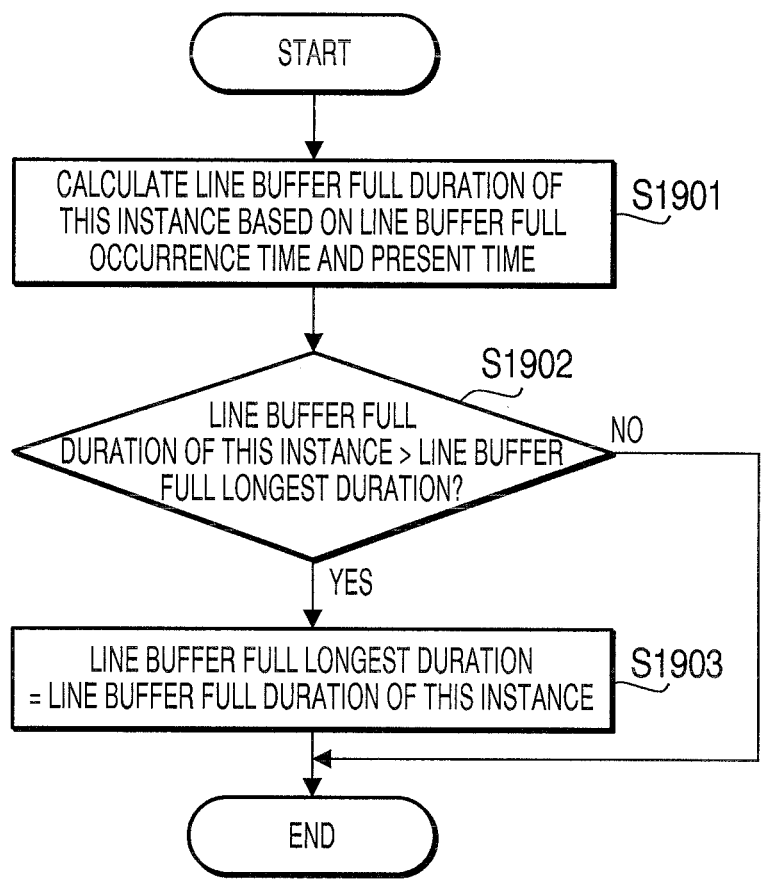
FIG. 24 is a flow chart showing the process flow of the performance measurement #2 of the line buffer which is executed in the fifth embodiment.

FIG. 24 is a flow chart showing the process flow of the performance measurement #2 of the line buffer 32 which is executed in the fifth embodiment.

In step S1901, the CPU 28 calculates the time difference between the present time and the time held by the variable "line buffer full occurrence time" and regards the obtained time difference as the "line buffer full duration" of this instance.

In the next step S1902, the CPU 28 judges whether or not the "line buffer full duration" of this instance is longer than the "line buffer full longest duration". If affirmative (S1902: YES), the CPU 28 advances to step S1903, otherwise (S1902: NO) the CPU 28 ends the process (performance measurement #2).

In the step S1903, the CPU 28 sets the variable "line buffer full longest duration" at the "line buffer full duration" of this instance.

(5-5) Buffer Capacity Changing Process (Based on Performance Measurement Result)

Figure 25:
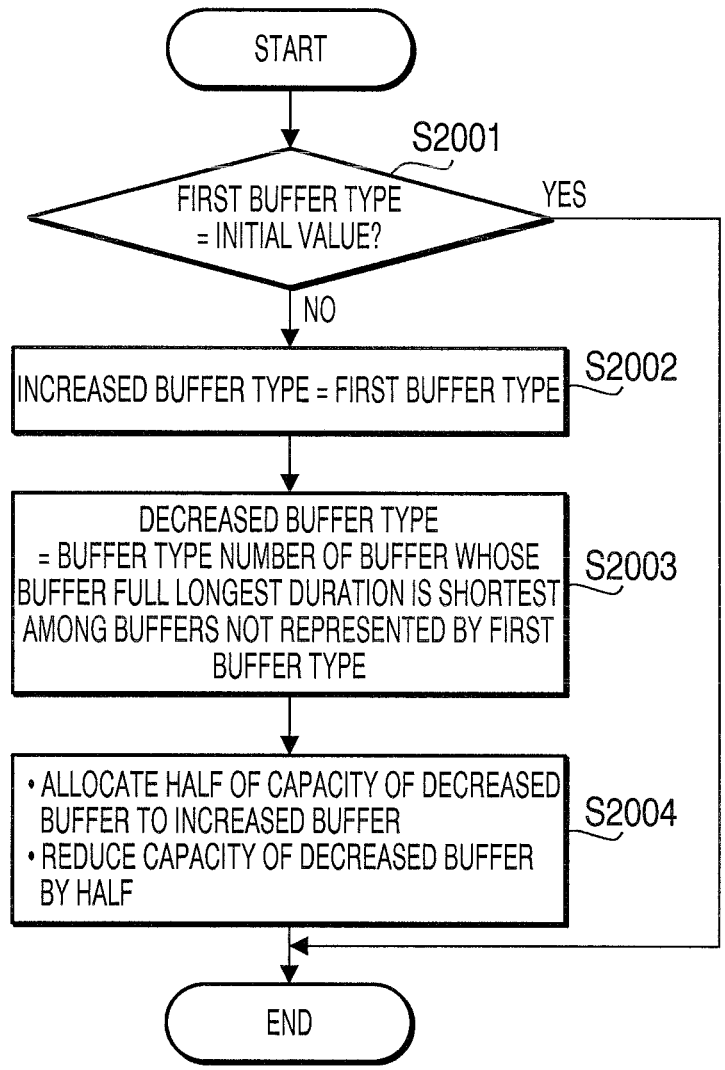
FIG. 25 is a flow chart showing the process flow of the buffer capacity changing process (based on performance measurement result) which is executed in the fifth embodiment.

FIG. 25 is a flow chart showing the process flow of the buffer capacity changing process (based on performance measurement result) which is executed in the fifth embodiment.

In step S2001, the CPU 28 judges whether or not the variable "first buffer type" still remains at the initial value which was set in S1701. If the "first buffer type" remains at the initial value (S2001: YES), the CPU 28 ends the buffer capacity changing process, otherwise (S2001: NO) the CPU 28 advances to step S2002.

In the step S2002, the CPU 28 sets the variable "increased buffer type" at the buffer type number at which the variable "first buffer type" has been set (i.e. the current value of the "first buffer type"), by which the buffer entering the buffer-full state first is specified as the target of increasing the storage capacity.

In the next step S2003, the CPU 28 sets the variable "decreased buffer type" at the buffer type number of the buffer whose "buffer full longest duration" is the shortest among buffers other than the buffer (whose buffer type number is) represented by the variable "first buffer type".

In the next step S2004, the CPU 28 allocates half of the storage area of the buffer (whose buffer type number is) represented by the "decreased buffer type" to the buffer (whose buffer type number is) represented by the "increased buffer type".

For example, when the decreased buffer (buffer represented by the "decreased buffer type") is the compression buffer 34 and the increased buffer (buffer represented by the "increased buffer type") is the I/F transfer buffer 35, the storage area allocation is changed between the two buffers 34 and 35 as follows:

compression buffer capacity=1MB/2=0.5 MB
I/F transfer buffer capacity=1 MB+0.5 MB=1.5 MB As described above, in the case where the storage area of the buffer entering the buffer-full state first is increased, it is possible to decrease the storage area of the buffer having the shortest duration of the buffer-full state among the buffers other than the buffer entering the buffer-full state first.

<Modifications>

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

(1) For example, while the usage status of each buffer is acquired only when the document to be scanned includes two or more pages (without acquiring the usage status when the document is a single-page document) in the above embodiments, the usage status of each buffer may also be acquired even when the document is a single-page document.

(2) While the first page of a document including multiple pages was used as the "prescribed area" in the above embodiments, the "prescribed area" can be any area (not restricted to the first page) as long as the area is sufficiently large and the result of the changing of the storage area allocation based on the usage status of each buffer acquired during the scanning (from the image scanning to the image data transmission, or during the scanning of a predetermined area, ditto for the following expressions "scanning") of the area is expected not to differ much from the result based on the usage status of each buffer acquired during the scanning of the whole document (all pages). For example, it is possible to acquire the usage status during the scanning of half a page from the front end of the document, the usage status during the scanning of the first two pages of the document, etc.

When the usage status of each buffer during the scanning of a prescribed area of the document is acquired as above, it is possible to execute the acquisition of the usage status (of each buffer from the image scanning of a prescribed area to the transmission of image data of the prescribed area) in regard to multiple prescribed areas which are separate from each other in the document and change the storage area allocation between/among two or more buffer areas based on the usage status upon each acquisition of the usage status in regard to each prescribed area.

For example, when the document to be scanned includes six pages, the usage status of each buffer may be acquired in regard to the first page, third page and fifth page of the document. When the document is a single-page document, it is possible to segment the document into multiple areas arranged in the scanning direction and acquire the usage status every other area, by which the storage area allocation can be changed more precisely in response to variations in the contents of the document during the scanning of the whole document, by which the changing of the storage area allocation can be carried out more appropriately.

While the prescribed area was set with reference to the document in the above embodiments, the prescribed area may be set differently (e.g. with reference to the scanning operation of the scanning unit 21). For example, it is possible to acquire the usage status during the scanning of a certain area (e.g. XXX cm$^2$) by the scanning unit 21. In this case, the scanned area can vary (½ page, ¼ page, etc.) depending on the document size.

(3) While the changing of the storage area allocation was executed with no priority order (order of priority) among the buffers (e.g. simply increasing the storage capacity of a buffer entering the buffer-full state first) in the above embodiments, it is possible to set certain priority order among the buffers in regard to the storage area allocation. For example, when a buffer of the highest priority entered the buffer-full state second among the buffers, the storage area allocation may be changed by increasing the storage area of the buffer of the highest priority (not by increasing the storage area of a buffer entering the buffer-full state first).

Specifically, when the buffer-full state occurs in the line buffer 32, the scanning operation of the MFP 1 stops as mentioned above. In other words, the feeding of the document (by the ADF 19) or the CIS (by the carriage 25) is stopped and thereafter resumed. Repetition of such stoppage and resumption might deteriorate the image quality. In this case, it is possible to assign high priority to the line buffer 32 and allocate a large storage area preferentially to the line buffer 32.

(4) While the usage status of each buffer is acquired constantly and the storage area allocation is changed when the document being scanned includes multiple pages in the above embodiments, the acquisition of the usage status and the changing of the storage area allocation may be left out when the image data is transmitted to the same destination by the same interface as the previous time.

In general, the usage status of each buffer is greatly affected by the transmission capability of the interface. Conversely, if the transmission capability is the same as that in the previous time, it is probable that almost the same performance as that in the previous time can be maintained (even though there can be effects of processing units other than the interface). Incidentally, the transmission capability is dependent not only on the interface but also on reception capability of the device as the destination of the image data. Therefore, when the destination and the interface are the same as those in the previous time, the processing efficiency can be increased by leaving out the usage status acquisition and the allocation changing on the assumption that almost the same performance as that in the previous time can be maintained.

(5) While four buffers (line buffer 32, post-image processing buffer 33, compression buffer 34 and I/F transfer buffer 35) were described as examples of buffer areas in the above embodiments, the number and types of the buffers are not restricted to those in the embodiments.

(6) While the order of occurrence of the buffer-full state, the number of times of the buffer-full state, the buffer full longest duration and the minimum free space of each buffer were used as examples of the usage status in the above embodiments, the usage status are not restricted to these examples. It is also possible to properly combine some of the examples and use the combination as the usage status.

(7) While the capacity of the buffer represented by the variable "decreased buffer type" was reduced by ½ in the above embodiments, it is possible to change the coefficient of reduction (to ⅓, for example) or calculate the amount of the storage area reduction based on capacity ratio among the buffers, etc.

(8) While the capacity of one buffer was increased and that of one or two buffers was decreased in the above embodiments, the combination of (the number of) the increased buffers and (the number of) the decreased buffers may be changed properly (e.g. increasing the storage areas of two buffers and decreasing that of one buffer).

In the above description, cases where scanned image data is transmitted to a PC or a network server through the USB interface 37 or the network interface 38 are explained as examples. It should be noted that the invention can be applied in various cases such as cases where the scanned image data is transmitted to the printer unit 12 for copying, to an external device by facsimile through the interface unit 14 (MODEM), to an external storage, an HDD (Hard Disk Drive) or a non-volatile memory (e.g., a flash memory) through the interface unit 14 (an interface connected to the external storage), or the like.

What is claimed is:

1. An image scanning device comprising:
a scanning unit configured to execute image scanning of a document and thereby generates image data;
at least one processing unit configured to successively process the image data outputted from the scanning unit;
a transmission unit configured to transmit the image data outputted from the processing unit;
a storage unit, in which multiple buffer areas to be used for transferring the image data among the scanning unit, the at least one processing unit and the transmission unit are allocated;
a controller configured to execute:
acquiring information on usage status of each of the buffer areas during a period from scanning a part of the document consisting of a plurality of sheets or a period from scanning a part of the document consisting of a single sheet to transmission of the image data of the part of the document;
changing storage area allocation at least between two of the buffer areas based on the usage status after acquiring the usage status of the part of the document; and
scanning a remainder of the document using the buffer area after changing storage area allocation.

2. The image scanning device according to claim 1, wherein:
the controller is configured to execute acquiring the usage status of each of the buffer areas from the image scanning of a prescribed area of the document to the transmission of the image data of the prescribed area, and
the controller is configured to execute changing the storage area allocation between/among two or more buffer areas based on the usage status upon the acquisition of the usage status.

3. The image scanning device according to claim 2, wherein:
the controller is configured to execute acquiring the acquisition of the usage status of each of the buffer areas from the image scanning of a prescribed area to the transmission of the image data of the prescribed area in regard to multiple prescribed areas which are separate from each other in the document, and
the controller is configured to execute changing the storage area allocation between/among two or more buffer areas based on the usage status upon each acquisition of the usage status.

4. The image scanning device according to claim 1, wherein the acquisition of the usage status and the changing of the storage area allocation are not executed when the image data is transmitted to the same destination by the same transmission unit as the previous time.

5. The image scanning device according to claim 1, wherein:
the controller is configured to execute acquiring the order of occurrence of a buffer-full state among the buffer areas as the usage status of each buffer area, and
the controller is configured to execute decreasing the storage area allocation to a buffer area entering the buffer-full state relatively late among the buffer areas while increasing the storage area allocation to a buffer area entering the buffer-full state relatively early among the buffer areas.

6. The image scanning device according to claim 5, wherein:
the controller is configured to execute acquiring minimum free space of each buffer area as the usage status of each buffer area, and
when the controller is configured to execute decreasing the storage area allocation to a buffer area not entering the buffer-full state, the controller is configured to execute decreasing the allocation by minimum free space of the buffer area while increasing the storage area allocation to a different buffer area by the same amount.

7. The image scanning device according to claim 1, wherein:
the controller is configured to execute acquiring the number of times of a buffer-full state occurring in each buffer area as the usage status of each buffer area, and
the controller is configured to execute decreasing the storage area allocation to a buffer area whose number of times of the buffer-full state is relatively small among the buffer areas while increasing the storage area allocation to a buffer area whose number of times of the buffer-full state is relatively large among the buffer areas.

8. The image scanning device according to claim 7, wherein:
the controller is configured to execute acquiring minimum free space of each buffer area as the usage status of each buffer area, and
when the controller executes decreasing the storage area allocation to a buffer area not entering the buffer-full state, the controller executes decreasing the allocation by minimum free space of the buffer area while increasing the storage area allocation to a different buffer area by the same amount.

9. The image scanning device according to claim 1, wherein:
the controller is configured to execute acquiring duration of a buffer-full state occurring in each buffer area as the usage status of each buffer area, and the controller is configured to execute decreasing the storage area allocation to a buffer area in which the duration of the buffer-full state is relatively short among the buffer areas while increasing the storage area allocation to a buffer area in which the duration of the buffer-full state is relatively long among the buffer areas.

10. The image scanning device according to claim 9, wherein:
the controller is configured to execute acquiring minimum free space of each buffer area as the usage status of each buffer area, and
when the controller executes decreasing the storage area allocation to a buffer area not entering the buffer-full state, the controller executes decreasing the allocation by minimum free space of the buffer area while increasing the storage area allocation to a different buffer area by the same amount.

11. The image scanning device according to claim 5, wherein:
the controller is configured to execute acquiring duration of the buffer-full state occurring in each buffer area as the usage status of each buffer area, and
when the controller executes increasing the storage area allocation to a buffer area entering the buffer-full state first among the buffer areas, the controller executes decreasing the storage area allocation to a buffer area having the shortest duration of the buffer-full state among buffer areas other than the buffer area entering the buffer-full state first.

12. The image scanning device according to claim 1, wherein the controller is configured to execute increasing the storage area allocation to a buffer area for storing the image data outputted from the scanning unit with higher priority compared to other buffer areas.

13. A computer-readable storage device storing a program including computer-readable instructions that cause a computer to execute an allocation process of allocating storage areas to multiple buffer areas of an image scanning device which is equipped with a scanning unit executing image scanning of a document and thereby generating image data, at least one processing unit successively processing the image data outputted from the scanning unit, a transmission unit transmitting the image data outputted from the processing unit and a storage unit in which the multiple buffer areas to be used for transferring the image data among the scanning unit, the at least one processing unit and the transmission unit are allocated, wherein the allocation process comprises:
an acquisition step of acquiring information on usage status of each of the buffer areas during a period from scanning a part of the document consisting of a plurality of sheets or a period from scanning a part of the document consisting of a single sheet to transmission of the image data of the part of the document;
a changing step of changing the storage area allocation at least between two of the buffer areas based on the acquired usage status after the acquiring the usage status of the part of the document; and
a second scanning step of scanning a remainder of the document using the buffer area after the changing step is executed.

14. The computer-readable storage device according to claim 13, wherein:
the acquisition step acquires the usage status of each of the buffer areas from the image scanning of a prescribed area of the document to the transmission of the image data of the prescribed area, and the changing step changes the storage area allocation between/among two or more buffer areas based on the usage status upon the acquisition of the usage status by the acquisition step.

15. The computer-readable storage device according to claim 14, wherein:
    the acquisition step executes the acquisition of the usage status of each of the buffer areas from the image scanning of a prescribed area to the transmission of the image data of the prescribed area in regard to multiple prescribed areas which are separate from each other in the document, and
    the changing step changes the storage area allocation between/among two or more buffer areas based on the usage status upon each acquisition of the usage status by the acquisition step.

16. The computer-readable storage device according to claim 13, wherein the acquisition of the usage status by the acquisition step and the changing of the storage area allocation by the changing step are not executed when the image data is transmitted to the same destination by the same transmission unit as the previous time.

17. The computer-readable storage device according to claim 13, wherein:
    the acquisition step acquires the order of occurrence of a buffer-full state among the buffer areas as the usage status of each buffer area, and
    the changing step decreases the storage area allocation to a buffer area entering the buffer-full state relatively late among the buffer areas while increasing the storage area allocation to a buffer area entering the buffer-full state relatively early among the buffer areas.

18. The computer-readable storage device according to claim 13, wherein:
    the acquisition step acquires the number of times of a buffer-full state occurring in each buffer area as the usage status of each buffer area, and
    the changing step decreases the storage area allocation to a buffer area whose number of times of the buffer-full state is relatively small among the buffer areas while increasing the storage area allocation to a buffer area whose number of times of the buffer-full state is relatively large among the buffer areas.

19. The computer-readable storage device according to claim 13, wherein:
    the acquisition step acquires duration of a buffer-full state occurring in each buffer area as the usage status of each buffer area, and
    the changing step decreases the storage area allocation to a buffer area in which the duration of the buffer-full state is relatively short among the buffer areas while increasing the storage area allocation to a buffer area in which the duration of the buffer-full state is relatively long among the buffer areas.

* * * * *